(12) United States Patent
Akiyama et al.

(10) Patent No.: US 9,240,838 B2
(45) Date of Patent: Jan. 19, 2016

(54) OPTICAL TRANSMITTER AND METHOD FOR CONTROLLING BIAS FOR OPTICAL MODULATOR

(71) Applicant: FUJITSU LIMITED, Kawasaki-shi, Kanagawa (JP)

(72) Inventors: Yuichi Akiyama, Kawasaki (JP); Takeshi Hoshida, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 278 days.

(21) Appl. No.: 13/722,226

(22) Filed: Dec. 20, 2012

(65) Prior Publication Data

US 2013/0202315 A1    Aug. 8, 2013

(30) Foreign Application Priority Data

Feb. 6, 2012    (JP) .................. 2012-023499

(51) Int. Cl.
*H04B 10/50*    (2013.01)
*H04B 10/564*    (2013.01)

(52) U.S. Cl.
CPC ............ *H04B 10/50* (2013.01); *H04B 10/5053* (2013.01); *H04B 10/50575* (2013.01); *H04B 10/50595* (2013.01); *H04B 10/564* (2013.01)

(58) Field of Classification Search
CPC .............................................. H04B 10/50575
USPC .......................................................... 398/198
See application file for complete search history.

(56) References Cited

U.S. PATENT DOCUMENTS

| | | |
|---|---|---|
| 2001/0007508 A1 | 7/2001 | Ooi et al. |
| 2002/0003648 A1 | 1/2002 | Kobayashi et al. |
| 2008/0080872 A1 | 4/2008 | Tanaka et al. |
| 2008/0187324 A1 | 8/2008 | Akiyama et al. |
| 2009/0196612 A1 | 8/2009 | Lee et al. |
| 2009/0232517 A1 | 9/2009 | Farina et al. |
| 2010/0080571 A1 | 4/2010 | Akiyama et al. |
| 2011/0026935 A1* | 2/2011 | Akiyama et al. .............. 398/184 |

FOREIGN PATENT DOCUMENTS

| | | |
|---|---|---|
| CN | 101986576 | 3/2011 |
| EP | 1 906 564 A1 | 4/2008 |
| EP | 2 280 498 A1 | 2/2011 |
| EP | 2 367 302 A1 | 9/2011 |
| JP | 2000-122015 | 4/2000 |
| JP | 2000-162563 | 6/2000 |

(Continued)

OTHER PUBLICATIONS

Extended European Search report dated Apr. 5, 2013 in European Patent Application No. 13150253.6-1860.
Chinese Office Action dated Mar. 9, 2015 in corresponding Chinese Patent Application No. 201310012121.3.
Japanese Office Action dated Jun. 23, 2015 in corresponding Japanese Patent Application No. 2012-023499, 3 pages.

(Continued)

*Primary Examiner* — Shi K Li
(74) *Attorney, Agent, or Firm* — Staas & Halsey LLP

(57) ABSTRACT

An optical transmitter includes a signal generator configured to generate a drive signal from input data, an optical modulator configured to have a voltage-to-light-intensity characteristic in which intensity of output light changes in response to an applied voltage, and to generate a light signal that corresponds to the drive signal, a multiplier configured to multiply the drive signal and an electric signal that is obtained from the light signal; and a control section configured to control, based on output of the multiplier, a bias voltage for the optical modulator.

10 Claims, 23 Drawing Sheets

(56) References Cited

FOREIGN PATENT DOCUMENTS

| JP | 2002-023122 | 1/2002 |
| JP | 2008-092172 | 4/2008 |
| JP | 2008-520124 | 6/2008 |
| JP | 2009-246578 | 10/2009 |
| JP | 2010-081287 | 4/2010 |

OTHER PUBLICATIONS

Chinese Office Action dated Nov. 2, 2015 in corresponding Chinese Patent Application No. 201310012121.3, 6 pages.

* cited by examiner

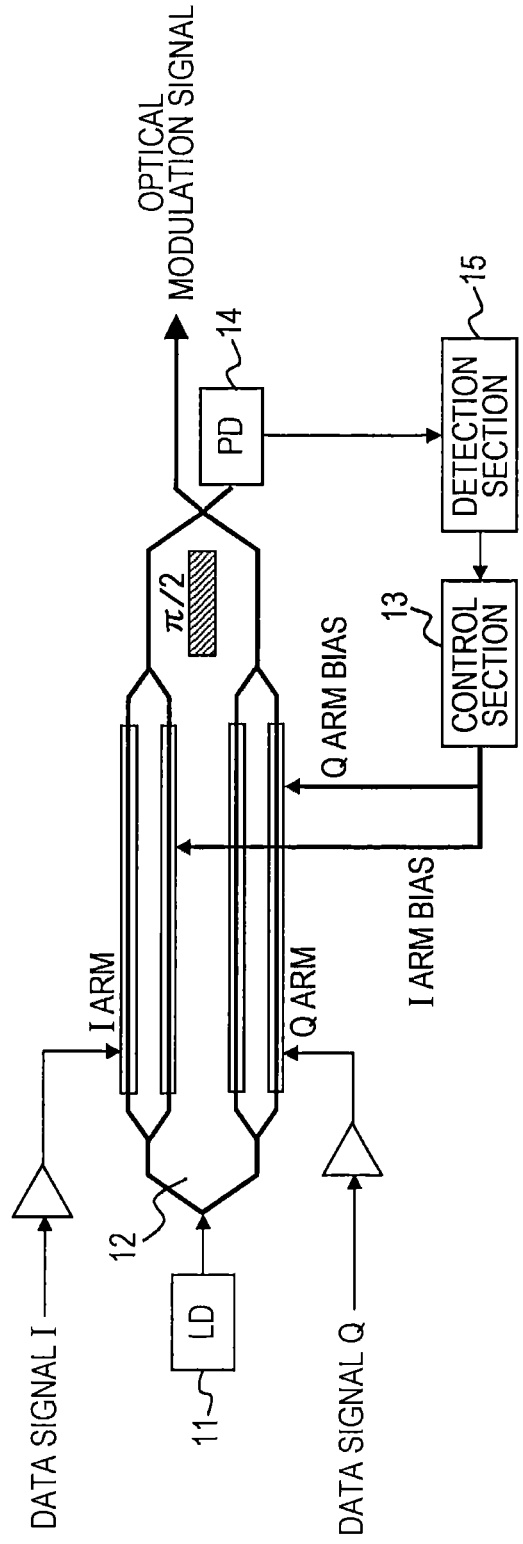

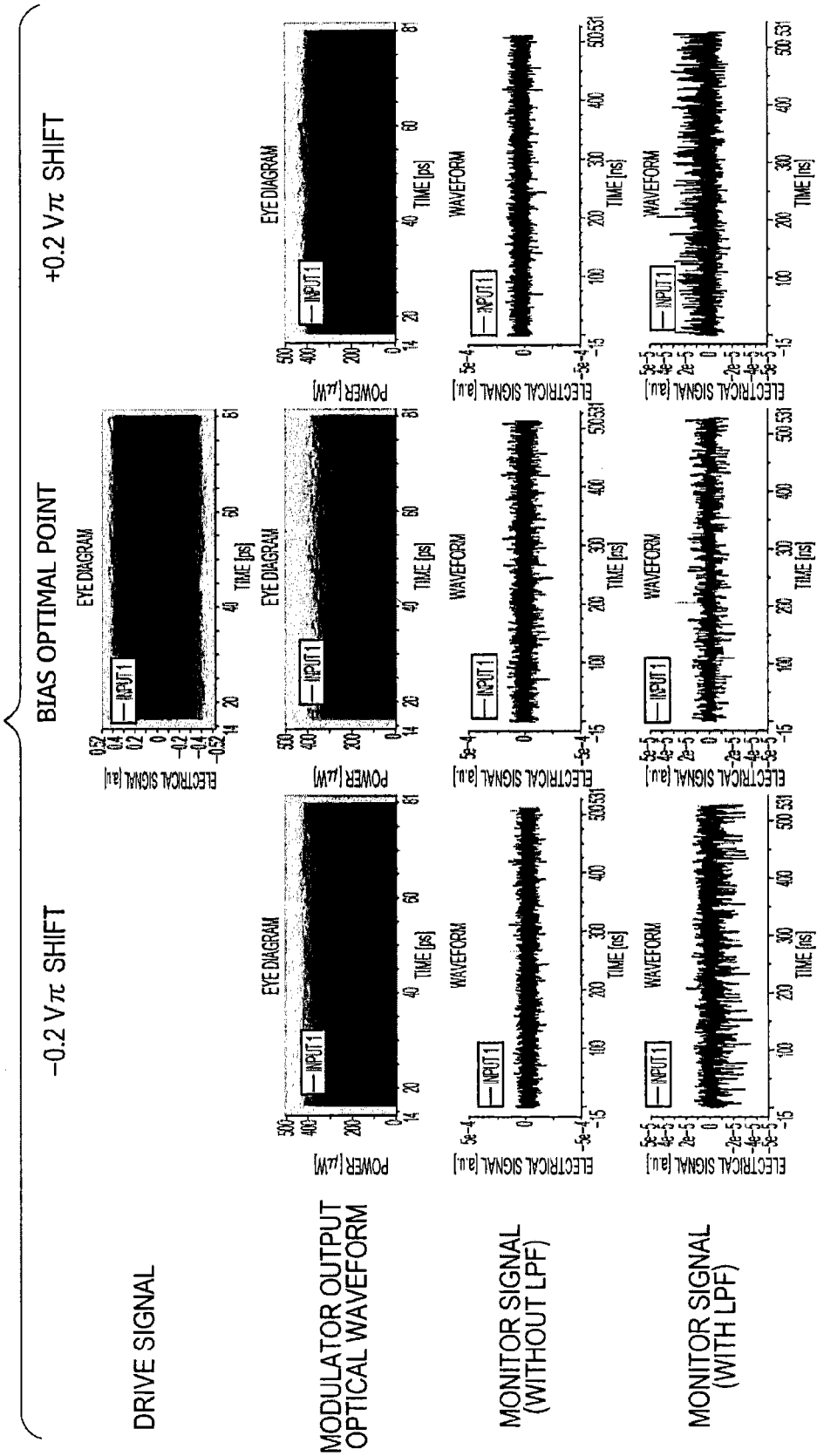

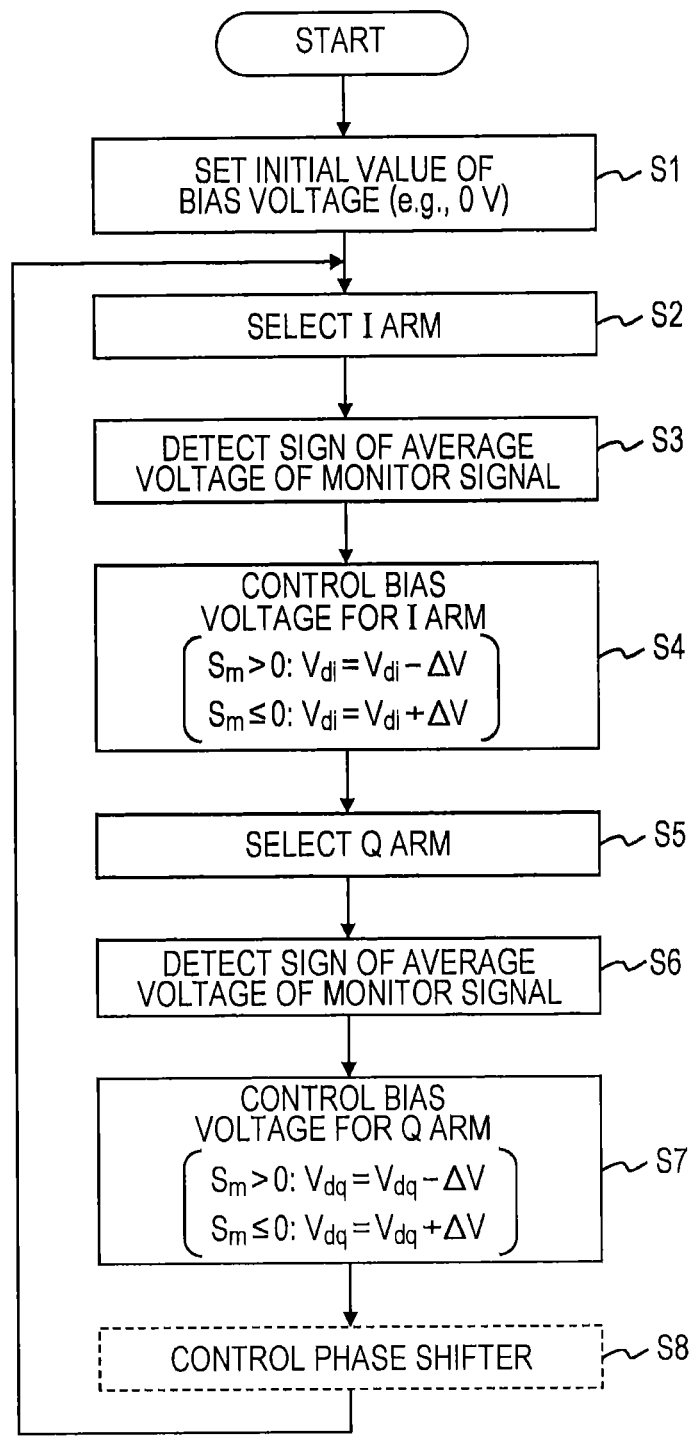

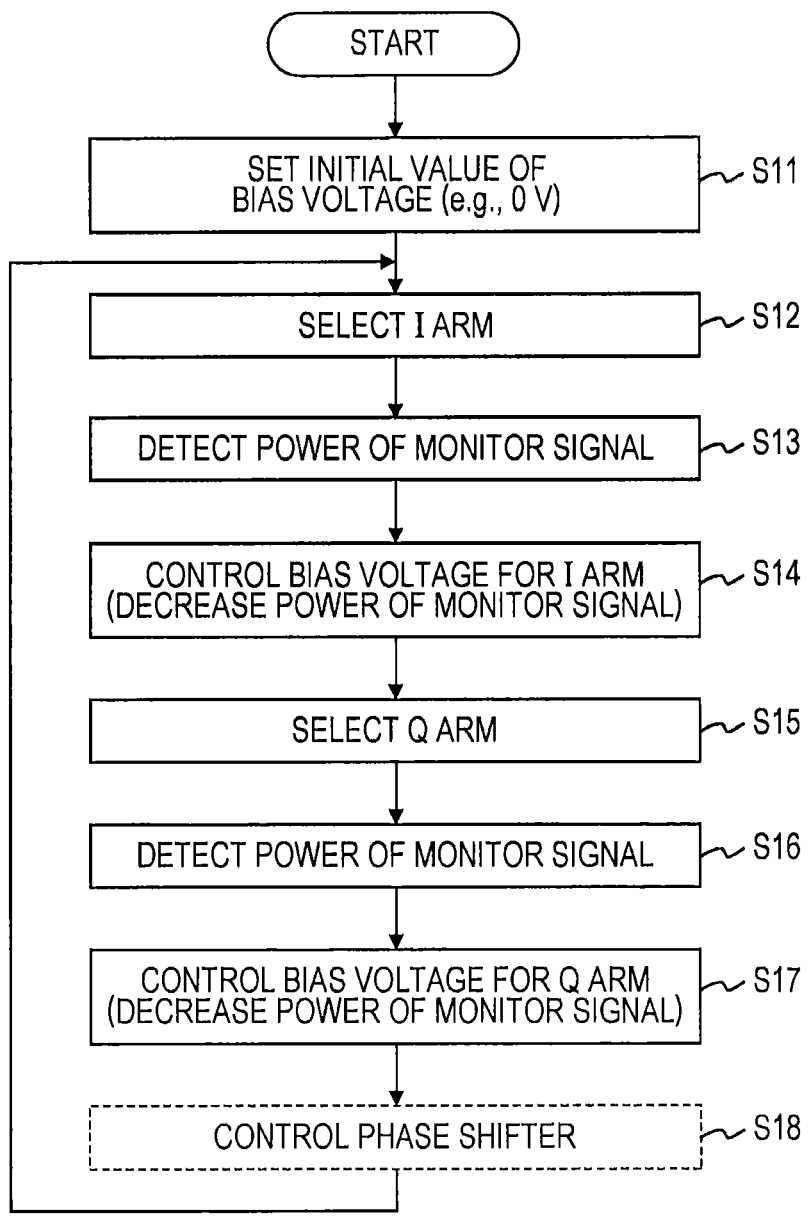

CHROMATIC DISPERSION: 0 ps/nm

CHROMATIC DISPERSION: 3,000 ps/nm

CHROMATIC DISPERSION: 10,000 ps/nm

OPTICAL TRANSMITTER AND METHOD FOR CONTROLLING BIAS FOR OPTICAL MODULATOR

CROSS-REFERENCE TO RELATED APPLICATION

This application is based upon and claims the benefit of priority of the prior Japanese Patent Application No. 2012-023499, filed on Feb. 6, 2012, the entire contents of which are incorporated herein by reference.

FIELD

The embodiments discussed herein are related to an optical transmitter and a method for controlling the bias of an optical modulator in an optical transmitter.

BACKGROUND

In order to realize a next-generation long-distance large-capacity communication system, research and development have been conducted regarding technology to generate a transmission signal using digital signal processing in an optical transmitter. For example, digital signal processing is used to generate a desired light signal waveform such as a dispersion pre-equalized signal and a modulation signal.

FIG. 1 is a diagram illustrating an example of an optical transmitter. The optical transmitter illustrated in FIG. 1 includes a light source (a laser diode (LD)) 11 and an optical modulator 12. The optical modulator 12 is, for example, a Mach-Zehnder-type lithium niobate (LN) modulator and includes an I arm and a Q arm. In addition, the optical modulator 12 includes a phase shifter to provide an optical phase difference of $\pi/2$ between the I arm and the Q arm.

Continuous (continuous wave (CW)) light generated by the light source 11 is split by an optical splitter and guided to the I arm and the Q arm of the optical modulator 12. In addition, a data signal I and a data signal Q are provided to the I arm and the Q arm, respectively, of the optical modulator 12. The amplitude of both the data signal I and the data signal Q is, for example, $2V\pi$. $V\pi$ is a voltage corresponding to a half cycle of a drive-voltage-to-light-intensity characteristic of an LN modulator (namely, a half-wave voltage). In the I arm, the continuous light is modulated with the data signal I to generate an I arm modulated light signal. Similarly, in the Q arm, the continuous light is modulated with the data signal Q to generate a Q arm modulated light signal. The I arm modulated light signal and the Q arm modulated light signal are combined to generate a QPSK modulated light signal.

In the optical transmitter including the above configuration, bias voltages for the I arm and the Q arm are appropriately controlled in order to generate a high-quality light signal. In order to control the bias voltage for the optical modulator 12, the optical transmitter includes a control section 13, a photodetector (PD) 14, and a detecting section 15.

The control section 13 superimposes a low-frequency signal on the bias voltage for the optical modulator 12. Hereinafter, f0 represents the frequency of the low-frequency signal. The modulated light signal output from the optical modulator 12 includes a frequency component (namely, the f0 component) of the low-frequency signal. The photodetector 14 converts the modulated light signal output from the optical modulator 12 into an electric signal. The detecting section 15 detects the intensity and phase of the f0 component included in the modulated light signal, based on the electric signal generated by the photodetector 14. The control section 13 performs feedback control on the bias voltages for the I arm and the Q arm so that the f0 component included in the modulated light signal approaches zero. As a result, the bias voltages for the I arm and the Q arm are optimized and a high-quality light signal may be generated. The above feedback control may be referred to as automatic bias control (ABC).

A method for controlling the bias of an optical modulator in an optical transmitter by using a low-frequency signal is disclosed in, for example, Japanese Laid-open Patent Application Publication No. 2000-162563.

The amplitude of a drive signal for the optical modulator (the data signal I and the data signal Q in FIG. 1) may change due to temperature or aging. However, the change of the amplitude of the drive signal due to temperature and aging is small. Thus, with an optical transmitter of the related art, the amplitude of the drive signal is almost uniform during operation of a communication system.

In contrast, in an optical transmitter that uses digital signal processing to generate a transmission signal, change of a modulation method and/or change of a pre-equalization amount may be performed during operation of a communication system. When the modulation method and/or the pre-equalization amount are changed, the amplitude of a drive signal for light modulation may change.

For example, FIG. 2A illustrates the waveform of a drive signal when the optical transmitter performs QPSK modulation, and FIG. 2B illustrates the waveform of a drive signal when the optical transmitter performs 16-QAM modulation. In this example, with QPSK modulation, the amplitude of the drive signal is about $2V\pi$. In addition, with 16-QAM modulation, the amplitude of the drive signal is about $0.6V\pi$. As described above, when the modulation method changes, the amplitude of the drive signal also changes.

FIG. 2C illustrates the waveform of a drive signal when the optical transmitter performs QPSK modulation and executes pre-equalization. In this case, the amplitude of the drive signal is smaller than $V\pi$. The pre-equalization is implemented by previously providing distortion to a signal waveform in the transmitter so as to compensate for chromatic dispersion of an optical transmission path between the transmitter and a receiver. In addition, the pre-equalization is implemented by digital signal processing.

As described above, in a recent or future optical transmitter, a drive condition of an optical modulator (the amplitude of the drive signal in the above example) may greatly change in response to change of the modulation method or the like. When the drive condition changes, the bias for the optical modulator may possibly not be appropriately controlled, and the optical transmitter may possibly not be able to generate a high-quality light signal. Hereinafter, a problem of bias control of the related art will be described with reference to the configuration illustrated in FIG. 1.

FIG. 3 is a diagram illustrating bias control when the drive amplitude Vd is greater than $V\pi$. This operating state corresponds to, for example, when a light signal is generated by the QPSK modulation illustrated in FIG. 2A. FIG. 4 is a diagram illustrating bias control when the drive amplitude Vd' is less than $V\pi$. This operating state corresponds to, for example, the 16-QAM modulation illustrated in FIG. 2B or the pre-equalization illustrated in FIG. 2C.

In FIGS. 3 and 4, a bias voltage Vb for the optical modulator is shifted to the low-voltage side of an optimal point. In addition, a low-frequency signal f0 is superimposed on the bias voltage Vb.

When Vd is greater than $V\pi$, an f0 component A is generated at one edge of a drive signal and an f0 component B is generated at another edge of the drive signal as illustrated in FIG. 3. The f0 component A and the f0 component B are light signal components of the frequency f0 and are included in the modulated light signal. Therefore, the modulated light signal includes an f0 component C (C=A+B).

In this example, the amplitude of the f0 component B is higher than the amplitude of the f0 component A. Thus, the phase of the f0 component C is the same as the phase of the f0 component B. Here, the f0 component B is generated in a region in which the gradient of the drive-voltage-to-light-intensity characteristic is positive. Therefore, in this example, the phase of the f0 component C detected from the modulated light signal is the phase of the low-frequency signal superimposed on the bias voltage.

In this case, the bias voltage for the optical modulator is controlled based on the following rules (a) to (c).

(a) If the phase of the f0 component C is the same as the phase of the low-frequency signal superimposed on the bias voltage, the bias voltage is increased.

(b) If the phase of the f0 component C the opposite of the phase of the low-frequency signal superimposed on the bias voltage, the bias voltage is decreased.

(c) If the intensity of the f0 component C is zero, the bias voltage is maintained (zero includes a state of being less than a sufficiently low threshold).

In contrast, when Vd' is less than Vπ as illustrated in FIG. 4, an f0 component A' is generated at one edge of a drive signal and an f0 component B' is generated at another edge of the drive signal. The f0 component A' and the f0 component B' are light signal components of the frequency f0 and are included in the modulated light signal. Thus, the modulated light signal includes an f0 component C' (C'=A'+B').

In this example, the amplitude of the f0 component A' is higher than the amplitude of the f0 component B'. Therefore, the phase of the f0 component C' is the same as the phase of the f0 component A'. Here, the f0 component A' is generated in a region in which the gradient of the drive-voltage-to-light-intensity characteristic is negative. Thus, in this example, the phase of the f0 component C' detected from the modulated light signal is the opposite of the phase of the low-frequency signal superimposed on the bias voltage.

In this case, if the optical transmitter 1 uses the rules (a) to (c), the bias voltage is not controlled so as to approach the optimal point. In other words, according to the rules (a) to (c), when the phase of the f0 component C' is the opposite of the phase of the low-frequency signal superimposed on the bias voltage as illustrated in FIG. 4, control is performed so as to decrease the bias voltage. By so doing, the bias voltage is controlled in a direction in which a difference from the optimal point increases. As a result, feedback control for optimizing the bias voltage diverges.

As described above, in the related art, when the drive condition of the optical modulator changes, the bias voltage is not able to be appropriately controlled. When the bias voltage for the optical modulator is not appropriately controlled, the quality of a light signal transmitted from the optical transmitter deteriorates.

SUMMARY

According to an aspect of the invention, an optical transmitter includes a signal generator configured to generate a drive signal from input data, an optical modulator configured to have a voltage-to-light-intensity characteristic in which intensity of output light changes in response to an applied voltage, and to generate a light signal that corresponds to the drive signal, a multiplier configured to multiply the drive signal and an electric signal that is obtained from the light signal; and a control section configured to control, based on output of the multiplier, a bias voltage for the optical modulator.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram illustrating an example of an optical transmitter;

FIG. 8 is a diagram illustrating a simulation result regarding change of a monitor signal with respect to shift of a bias voltage;

FIG. 9 is a flowchart illustrating a bias controlling method according to the first embodiment;

FIG. 11 is a flowchart illustrating another bias controlling method according to the first embodiment;

DESCRIPTION OF EMBODIMENTS

Figure 5:
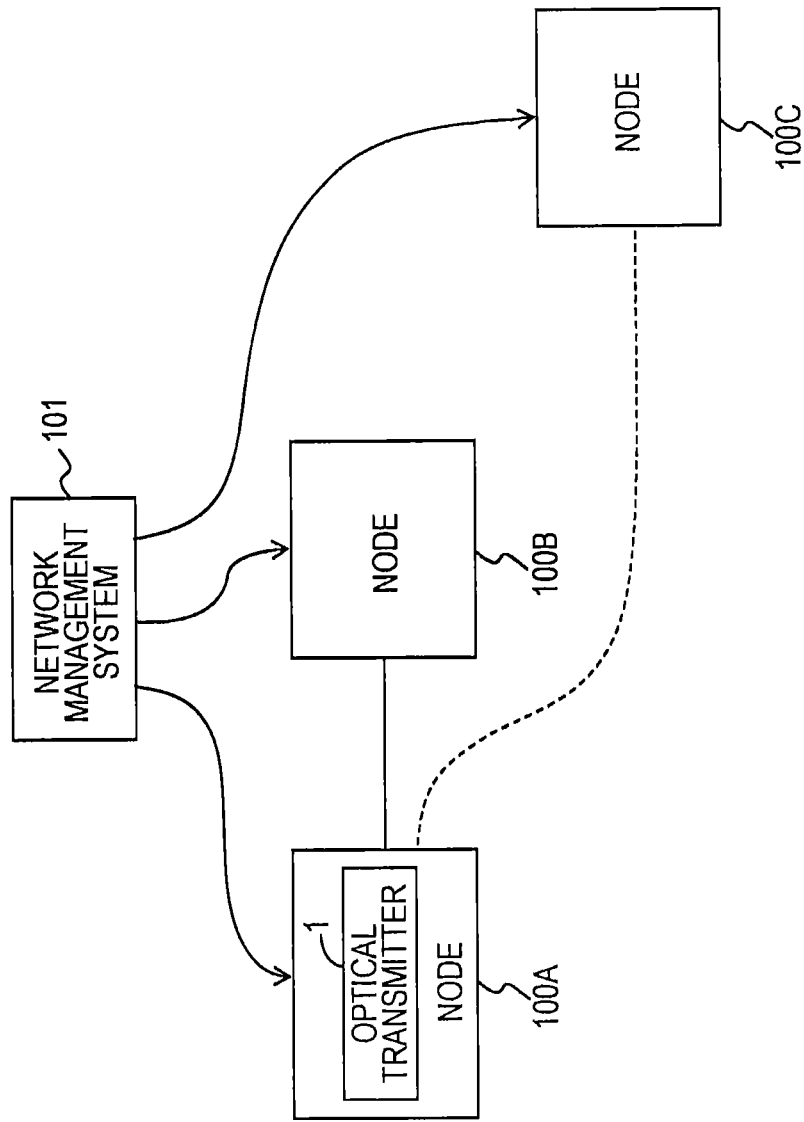
FIG. 5 is a diagram illustrating an example of a communication system in which an optical transmitter according to an embodiment is used.

FIG. 5 illustrates an example of a communication system in which an optical transmitter according to an embodiment is used. The communication system illustrated in FIG. 5 includes a plurality of optical nodes 100A to 100C and a network management system 101.

The optical transmitter 1 according to the embodiment is provided in the optical node 100A in FIG. 5. The optical nodes 100B and 100C also include optical transmitters of the same type. In addition, each of the optical nodes 100A to 100C includes a photoreceiver that receives a light signal. Each of the optical nodes 100A to 100C transmits a light signal to another optical node via an optical fiber.

The network management system 101 manages the communication system and provides instructions and control information to the optical nodes 100A to 100C. For example, with respect to the source node and destination node for data, the network management system 101 provides instructions about which modulation method to use. The modulation method is selected from, for example, BPSK, QPSK, DP-QPSK, 16-QAM, 256-QAM, and the like. In addition, the network management system 101 may notify the source node of the chromatic dispersion amount of an optical transmission path in accordance with the transmission distance of the light signal. Moreover, when a polarization-division multiplexed light signal is transmitted, the network management system 101 may notify the source node of a polarization rotation angle.

The optical transmitter 1 generates a light signal in accordance with the instruction and/or the control information received from the network management system 101. For example, the optical transmitter 1 generates a drive signal from a data signal by the modulation method designated by the network management system 101. In addition, the optical transmitter 1 may generate a drive signal that has been subjected to pre-equalization, in accordance with the chromatic dispersion amount or polarization rotation angle designated by the network management system 101. Then, an optical modulator of the optical transmitter 1 generates a modulated light signal with the drive signal generated as specified above.

As described above, in the example illustrated in FIG. 5, the optical transmitter 1 generates the drive signal for the optical modulator in accordance with the instruction and/or the control information received from the network management system 101. In other words, in the optical transmitter 1, a drive condition of the optical modulator (here, the amplitude of the drive signal) changes in response to the instruction and/or the control information received from the network management system 101.

Figure 6:
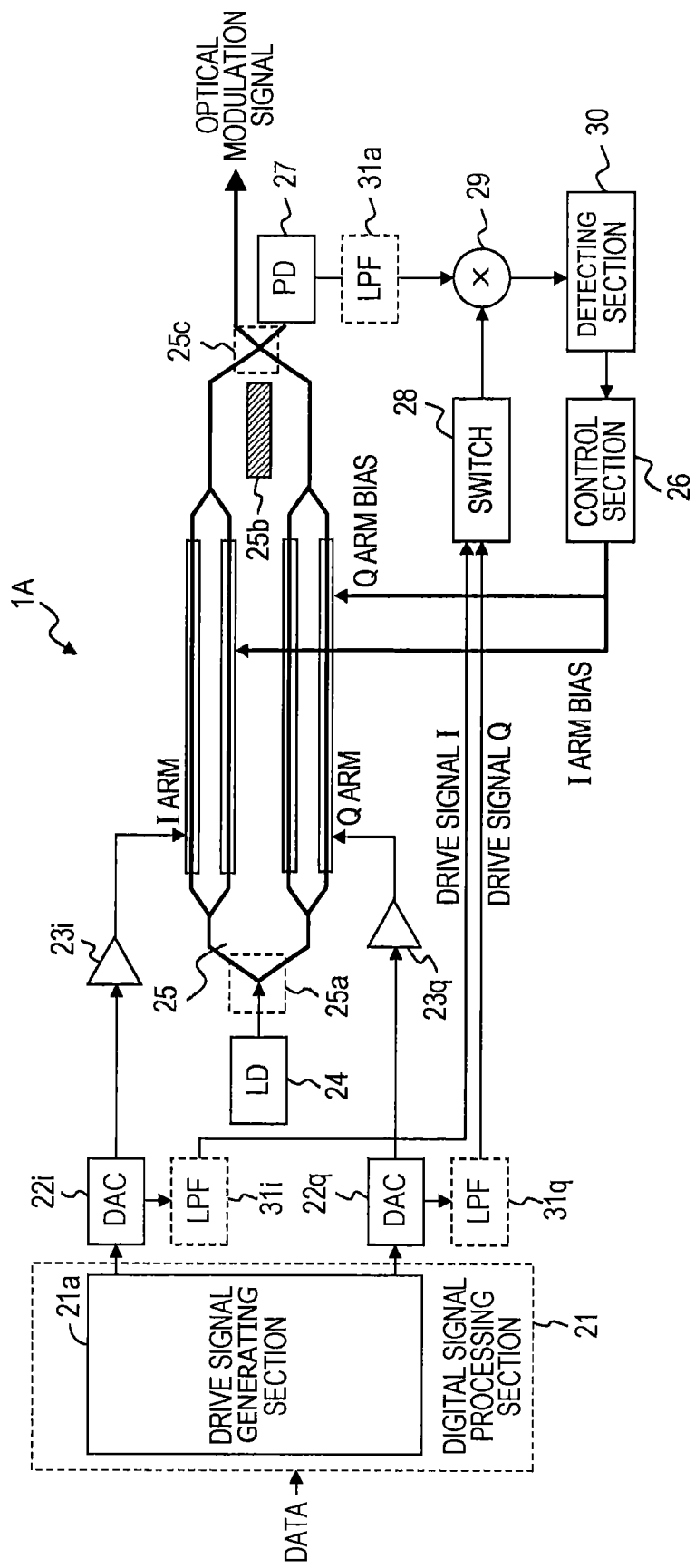
FIG. 6 is a diagram illustrating a configuration of an optical transmitter according to a first embodiment.

FIG. 6 illustrates a configuration of an optical transmitter according to a first embodiment. As illustrated in FIG. 6, the optical transmitter 1A according to the first embodiment includes a digital signal processing section 21, digital-to-analogue converters (DAC) 22i and 22q, amplifiers 23i and 23q, a light source (LD) 24, an optical modulator 25, a control section 26, a photodetector (PD) 27, a switch 28, a multiplier 29, and a detecting section 30.

The digital signal processing section 21 includes a drive signal generation section 21a that generates a drive signal I and a drive signal Q from transmission data. The transmission data is generated by, for example, an application layer, which is not shown. Alternatively, the transmission data is generated by a client and input into the optical transmitter 1A via a client line.

The digital signal processing section 21 is realized by using, for example, a processor and a memory. In addition to the function to generate a drive signal (namely, the drive signal generation section 21a), the digital signal processing section 21 may provide other functions.

The drive signal generation section 21a generates the drive signal I and the drive signal Q from the transmission data based on the instruction and/or the control information received from the network management system 101. In other words, the drive signal generation section 21a generates the drive signal I and the drive signal Q, for example, in accordance with the designated modulation method. The drive signal I and the drive signal Q are used as drive signals for the optical modulator 25.

The DACs 22i and 22q convert the drive signal I and the drive signal Q generated by the drive signal generation section 21a, respectively, into analog signals. The amplifiers 23i and 23q amplify the drive signal I and the drive signal Q output from the DACs 22i and 22q, respectively. The drive signal I and the drive signal Q amplified by the amplifiers 23i and 23q are applied to the I arm and the Q arm, respectively, of the optical modulator 25. Each of the amplifiers 23i and 23q is an electric amplifier that amplifies an electric signal. In addition, each of the amplifiers 23i and 23q has a gain control terminal that receives a gain control signal.

The light source 24 is, for example, a laser element that includes a laser diode and generates CW light. The CW light generated by the light source 24 is input into the optical modulator 25.

The optical modulator 25 is a Mach-Zehnder type LN modulator in this embodiment. In other words, the optical modulator 25 has a voltage-to-light-intensity characteristic in which the intensity of output light periodically changes with respect to an applied voltage. In addition, the optical modulator 25 includes an optical splitter 25a, the I arm, the Q arm, a phase shifter 25b, and an optical combiner 25c.

The optical splitter 25a splits and guides the input CW light to the I arm and the Q arm. The I arm includes an I arm optical waveguide and an I arm signal electrode formed adjacent to the I arm optical waveguide. The refractive index (that is, the optical path length) of the I arm optical waveguide changes in response to a voltage applied to the I arm signal electrode. Here, the drive signal I is applied to the I arm signal electrode. Therefore, in the I arm, the CW light is modulated by the drive signal I to generate a light signal I.

In this embodiment, the I arm includes a pair of optical waveguides. Signal electrodes are provided in the paired optical waveguides, respectively. In this case, although this is not a particular limitation, the drive signal I may be a differential signal.

The configuration of the Q arm is substantially the same as that of the I arm. In other words, the Q arm includes a Q arm optical waveguide and a Q arm signal electrode. However, the drive signal Q is applied to the Q arm signal electrode. Therefore, in the Q arm, the CW light is modulated with the drive signal Q to generate a light signal Q.

The phase shifter 25b provides an optical phase difference of $\pi/2$ between the I arm and the Q arm. The phase shifter 25b is realized by, for example, an electrode for adjusting the optical path length of the I arm and/or the Q arm. In this case, a voltage applied to the electrode is controlled by using a light signal output from the optical modulator 25.

The optical combiner 25c combines the light signal I generated by the I arm and the light signal Q generated by the Q arm. Thus, the optical modulator 25 generates a modulated light signal (for example, a QPSK modulated light signal).

The control section 26 controls the bias voltage of the optical modulator 25. The control section 26 separately controls the bias voltage for the I arm and the bias voltage for the Q arm. The control section 26 is realized by using, for example, software. Alternatively, the control section 26 is realized by software and a hardware circuit. Operation of the software may be implemented by using a processor and a memory.

The photodetector 27 converts the modulated light signal generated by the optical modulator 25 into an electric signal. In other words, the photodetector 27 outputs an electric signal that represents the modulated light signal generated by the optical modulator 25. The photodetector 27 is realized by, for example, a photodiode. The photodetector 27 is provided on the output side of the optical modulator 25. In this case, the photodetector 27 converts the modulated light signal output from the optical modulator 25 into an electric signal. When the optical modulator 25 includes a photodetector for monitoring the modulated light signal, the photodetector may be used as the photodetector 27.

The switch 28 selects, in accordance with control by the control section 26, the drive signal I output from the DAC 22i or the drive signal Q output from the DAC 22q. When the control section 26 controls the bias voltage for the I arm, the control section 26 causes the switch 28 to select the drive signal I. In addition, when the control section 26 controls the bias voltage for the Q arm, the control section 26 causes the switch 28 to select the drive signal Q.

The multiplier 29 multiplies the electric signal output from the photodetector 27 and the drive signal selected by the switch 28. Here, the electric signal represents the modulated light signal generated by the optical modulator 25 as described above. Thus, when the drive signal I is selected by the switch 28, the multiplier 29 multiplies the drive signal I and the electric signal that represents the light signal. In addition, when the drive signal Q is selected by the switch 28, the multiplier 29 multiplies the drive signal Q and the electric signal that represents the light signal. The multiplier 29 is realized by, for example, an analog mixer.

The detecting section 30 averages the output signal of the multiplier 29. In this case, the detecting section 30 includes an averaging device that averages an input signal. Alternatively, the detecting section 30 detects the power of the output signal of the multiplier 29. In this case, the detecting section 30 is realized by, for example, an RF power detector or an integrator that integrates an input signal.

The control section 26 controls the bias voltage for the optical modulator 25 based on the output signal of the detecting section 30. In other words, the control section 26 controls the bias voltage for the optical modulator 25 based on a signal obtained by multiplying the drive signal and an electric signal that represents the light signal.

The optical transmitter 1A transmits a light signal of several Gbit/s to several tens Gbit/s but is not particularly limited to this. In this case, the drive signals I and Q are very fast signals. If so, it is difficult to design a wiring pattern to introduce the drive signals I and Q, which are output from the DACs 22i and 22q, into the multiplier 29, and a wide-band expensive multiplier 29 is used.

In order to deal with this problem, the optical transmitter 1A may include low-pass filters (LPF) 31i and 31q. The cutoff frequency of each LPF may be set in accordance with the performance of the multiplier 29 and the like, and is, for example, in the range of several MHz to about 1 GHz.

The low-pass filter 31i filters the drive signal I output from the DAC 22i. The low-pass filter 31q filters the drive signal Q output from the DAC 22q. In this case, the switch 28 selects the drive signal I filtered by the low-pass filter 31i or the drive signal Q filtered by the low-pass filter 31q.

Similarly, the optical transmitter 1A may include a low-pass filter 31a that filters the electric signal output from the photodetector 27. The low-pass filter 31a is, for example, an LPF which is substantially the same as the low-pass filters 31i and 31q.

In the optical transmitter 1A including the above configuration, the drive signal generation section 21a generates the drive signals I and Q from the data signal. The optical modulator 25 uses the drive signals I and Q to generate the modulated light signal. The control section 26 controls the bias voltages for the I and Q arms of the optical modulator 25.

When controlling the bias voltage for the I arm, the control section 26 causes the switch 28 to select the drive signal I. By so doing, the multiplier 29 multiplies the drive signal I and the electric signal representing the light signal. Then, the control section 26 controls the bias voltage for the I arm based on the output of the multiplier 29 in this state. Conversely, when controlling the bias voltage for the Q arm, the control section 26 causes the switch 28 to select the drive signal Q. By so doing, the multiplier 29 multiplies the drive signal Q and the electric signal representing the light signal. Then, the control section 26 controls the bias voltage for the Q arm based on the output of the multiplier 29 in this state. The control of the bias voltage for the I arm and the control of the bias voltage for the Q arm are substantially the same.

Figure 7:
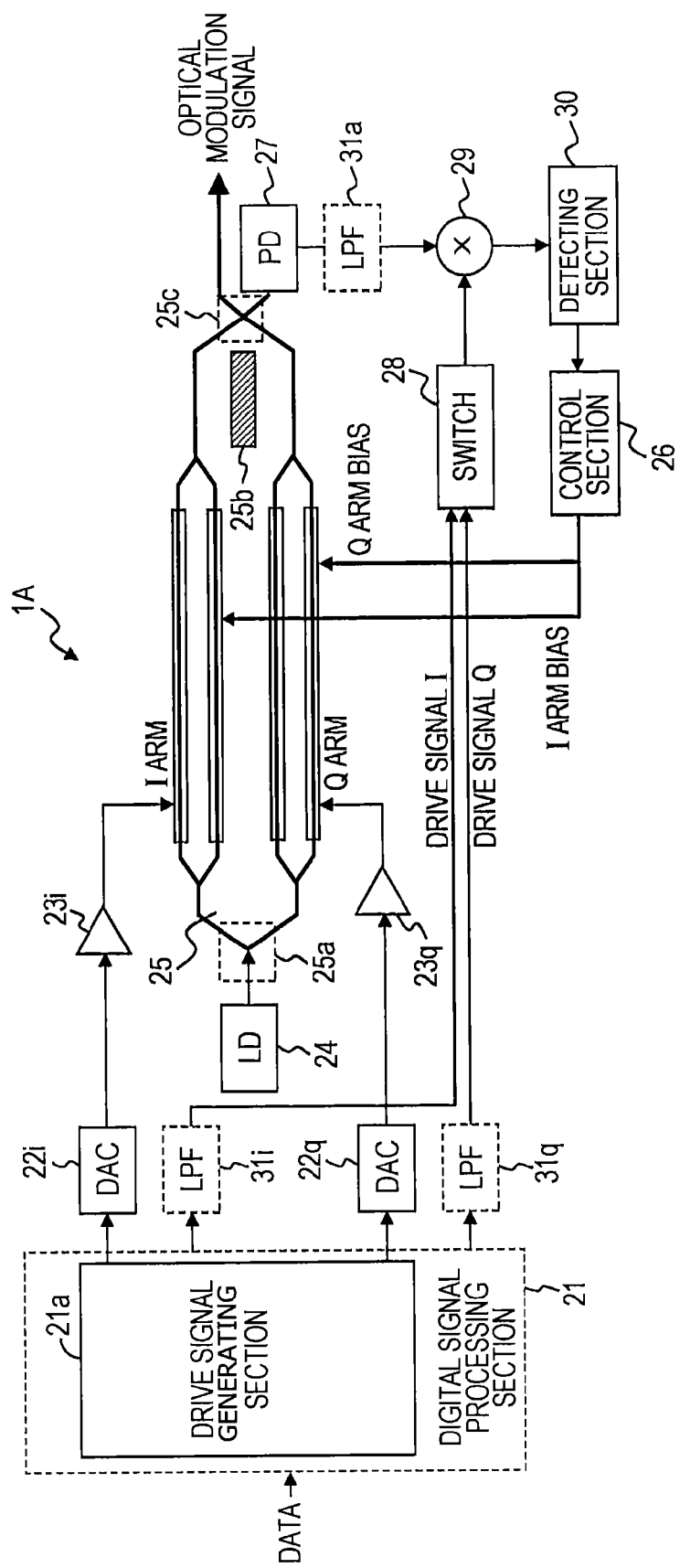
FIG. 7 is a diagram illustrating another configuration of the optical transmitter according to the first embodiment.

FIG. 7 illustrates another configuration of the optical transmitter according to the first embodiment. In the description of the configuration illustrated in FIG. 6, the low-pass filter 31i filters the drive signal I output from the DAC 22i. The low-pass filter 31q filters the drive signal Q output from the DAC 22q. However, in the embodiment regarding FIG. 7, the low-pass filter 31i filters the drive signal I output from the digital signal processing section 21. The filtered signal is transmitted to the switch 28. The low-pass filter 31q filters the drive signal Q output from the digital signal processing section 21. The filtered signal is transmitted to the switch 28. Other configurations are the same as configurations in the description given for FIG. 6, and thus the description thereof is omitted.

FIG. 8 illustrates a simulation result regarding change of the monitor signal with respect to shift of a bias voltage. This simulation is conducted under the following conditions. The modulation method is QPSK. In order to compensate for (that is, perform pre-equalization on) chromatic dispersion of an optical transmission path in the optical transmitter 1A, a waveform distortion corresponding to 10,000 ps/nm is provided. In other words, a waveform distortion is provided to the drive signal in the drive signal generation section 21a so that a chromatic dispersion of 10,000 ps/nm is compensated for. Then, in FIG. 8, a state where the bias voltage is controlled to be an optimal point, a state where the bias voltage is shifted from the optimal point by +0.2Vπ, and a state where the bias voltage is shifted from the optimal point by −0.2Vπ are illustrated.

The waveform distortion for compensating for the chromatic dispersion is provided to the drive signal as described above. Therefore, the drive signal is in a state where there is no opening of an eye pattern. In addition, in this example, the amplitude of the drive signal is 0.4×2Vπ. The drive signal illustrated in FIG. 8 indicates one of either the drive signal I or the drive signal Q.

The light signal is generated by the above drive signal. Therefore, in the waveform of the light signal as well, there is no opening of an eye pattern.

The monitor signal represents the output signal of the multiplier 29. In other words, the monitor signal is obtained by multiplying the electric signal that represents the light signal with the drive signal selected by the switch 28 (for example, the drive signal I). Here, when the bias voltage is controlled to be the optimal point, the center of the monitor signal is "zero". The monitor signal illustrated in FIG. 8 represents a voltage waveform.

If the bias voltage shifts from the optimal point, the center of the monitor signal also shifts from "zero". In this example, when the bias voltage is higher than the optimal point, the center of the monitor signal shifts to the positive voltage side of "zero". Conversely, when the bias voltage is lower than the optimal point, the center of the monitor signal shifts to the negative voltage side of "zero". This tendency is also the same when the optical transmitter 1A includes the low-pass filters 31a, 31i, and 31q, as illustrated in FIG. 8.

In the example illustrated in FIG. 8, the center of the monitor signal shifts to the positive voltage side when the bias voltage is higher than the optimal point, and the center of the monitor signal shifts to the negative voltage side when the bias voltage is lower than the optimal point. Depending on the configuration of the optical transmitter, the center of the monitor signal shifts to the negative voltage side when the bias voltage is higher than the optimal point, and the center of the monitor signal shifts to the positive voltage side when the bias voltage is lower than the optimal point. However, in any of these cases, when the bias voltage shifts from the optimal point, the center of the monitor signal also shifts in accordance with the direction of the shift.

Thus, the optical transmitter 1A detects the center level of the monitor signal by using the detecting section 30. In this case, the detecting section 30 is an averaging device that averages the voltage of an input signal. In other words, by averaging the voltage of the monitor signal, the center level of the monitor signal is detected. Then, the control section 26 controls the bias voltage so that the center level of the monitor signal obtained by the detecting section 30 approaches zero. In other words, feedback control using the monitor signal is performed. When the center level of the monitor signal approaches zero through this feedback control, the bias voltage for the optical modulator 25 approaches the optimal point and the quality of the light signal may be improved.

FIG. 9 is a flowchart illustrating a method for controlling the bias voltage for the optical modulator 25 in the optical transmitter 1A according to the first embodiment. Processing of the flowchart is executed by the control section 26. In addition, the processing of the flowchart is executed when the optical transmitter 1A transmits the light signal. However, the control section 26 may execute the processing of the flowchart when the optical transmitter 1A does not transmit the light signal. In this case, the drive signal generation section 21a may generate a dummy drive signal. The detecting section 30 outputs the average voltage of the monitor signal (that is, the output signal of the multiplier 29).

At reference sign S1, the control section 26 sets the bias voltages for each of the I arm and the Q arm to initial values. The initial values are not particularly limited but are, for example, zero volts. In this case, zero volts are provided as the bias voltage to the I arm and the Q arm of the optical modulator 25.

At S2, the control section 26 selects the I arm as a target for which the bias voltage is to be controlled. At this point, the control section 26 causes the switch 28 to select the drive signal I. By so doing, the switch 28 selects the drive signal I. Then, the multiplier 29 multiplies the drive signal I and the electric signal that represents the light signal to generate a monitor signal.

At S3, the control section 26 detects the sign of the average voltage (or the center level) of the monitor signal. At this point, the monitor signal is the result of multiplying the drive signal I and the electric signal that represents the light signal, and the average voltage of the monitor signal is obtained from the detecting section 30.

At S4, the control section 26 controls the bias voltage for the I arm based on the average voltage of the monitor signal. For example, if the average voltage of the monitor signal is greater than zero, the control section 26 decreases the bias voltage $V_{di}$ for the I arm by ΔV. ΔV is sufficiently small with respect to Vπ of the optical modulator 25. Conversely, if the average voltage of the monitor signal is lower than zero, the control section 26 increases the bias voltage $V_{di}$ for the I arm by ΔV. In other words, the control section 26 controls the bias voltage $V_{di}$ for the I arm so that the average voltage of the monitor signal approaches zero. $S_m$ illustrated in FIG. 9 represents the average voltage of the monitor signal.

Processes at S5 to S7 are substantially the same as those at S2 to S4. At S5 to S7, the bias voltage for the Q arm is controlled. In other words, at S5, the control section 26 selects the Q arm. By so doing, the switch 28 selects the drive signal Q, and the multiplier 29 multiplies the drive signal Q and the electric signal that represents the light signal in order to generate a monitor signal. At S6, the control section 26 detects the sign of the average voltage of the monitor signal. Then, at S7, the control section 26 controls the bias voltage for the Q arm based on the average voltage of the monitor signal. For example, if the average voltage of the monitor signal is higher than zero, the control section 26 decreases a bias voltage $V_{dp}$ for the Q arm by ΔV. Conversely, if the average voltage of the monitor signal is lower than zero, the control section 26 increases the bias voltage $V_{dp}$ for the Q arm by ΔV. In other words, the control section 26 controls the bias voltage $V_{dp}$ for the Q arm so that the average voltage of the monitor signal approaches zero. Then, at S8, the control section 26 controls the phase of the phase shifter 25b. A method for optimizing the phase of the phase shifter 25b is not particularly limited but may be implemented by a known technology. Thus, the detailed description of the method for optimizing the phase of the phase shifter 25b is omitted.

The control section 26 periodically repeats the processes at S2 to S8. Therefore, the bias voltage for the I arm of the optical modulator 25 and the bias voltage for the Q arm of the optical modulator 25 are continuously optimized or substantially optimized.

While S2 to S4 are executed, the bias voltage for the Q arm is held steady. Similarly, while S5 to S7 are executed, the bias voltage for the I arm is held steady.

If the average voltage of the monitor signal is zero or nearly zero at S4, the control section 26 may keep the bias voltage $V_{di}$ for the I arm steady. Similarly, if the average voltage of the monitor signal is zero or nearly zero at S7, the control section 26 may keep the bias voltage $V_{dp}$ for the Q arm steady.

The process at S8 of controlling the phase shifter 25b is inessential and may be omitted. In addition, the control section 26 may control the bias voltage for the Q arm before controlling the bias voltage for the I arm.

The flowchart illustrated in FIG. 9 illustrates control corresponding to the simulation result illustrated in FIG. 8. However, in a configuration in which the center level of the monitor signal shifts to the negative voltage side if the bias voltage is higher than the optimal point and the center level of the monitor signal shifts to the positive voltage side if the bias voltage is lower than the optimal point, different control from that as described above is performed at S4 and S7. In other words, in this case, if the average voltage of the monitor signal is higher than zero, the control section 26 increases the bias voltage by ΔV. Conversely, if the average voltage of the monitor signal is lower than zero, the control section 26 decreases the bias voltage by ΔV.

In the example illustrated in FIGS. 8 and 9, the control section 26 controls the bias voltage based on the center level of the monitor signal (that is, the average voltage of the monitor signal). In contrast, in the following example, the control section 26 controls the bias voltage based on the power of the monitor signal.

Figure 10A:
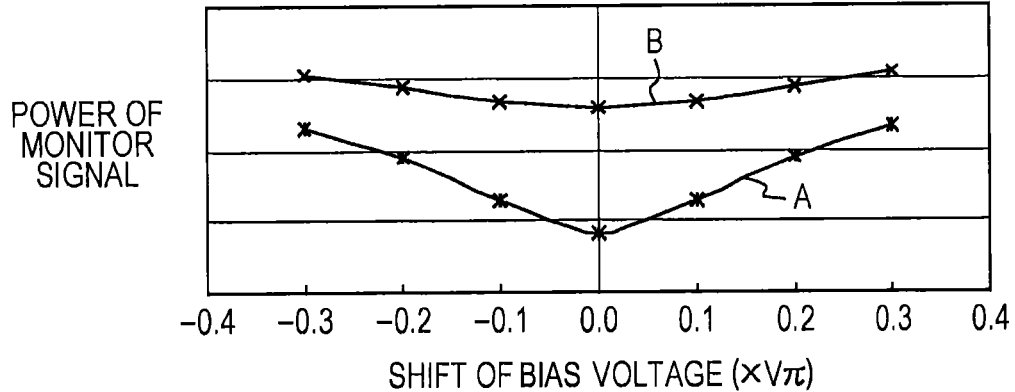
FIGS. 10A to 10C are diagrams illustrating a simulation result regarding the power of a monitor signal with respect to shift of a bias voltage.
Figure 10B:
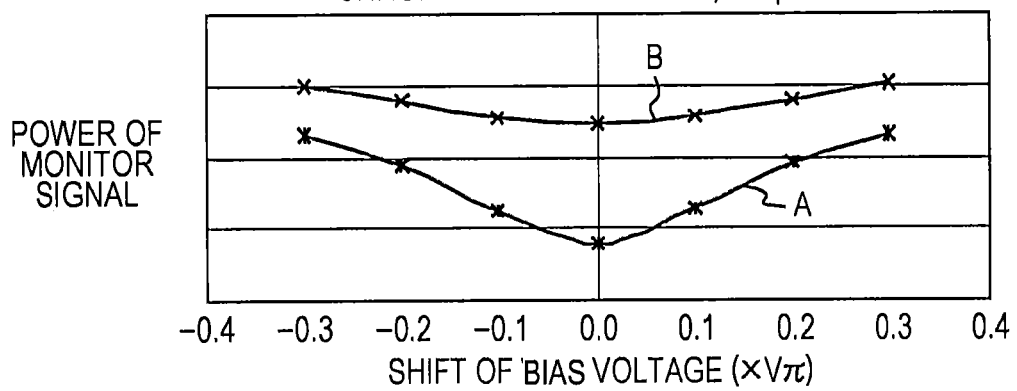
Figure 10C:
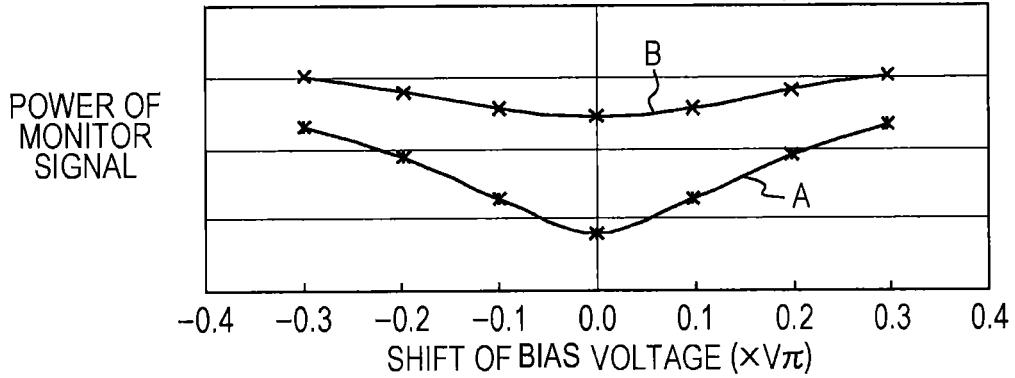

FIGS. 10A to 10C each illustrate a result of a simulation regarding the power of a monitor signal with respect to shift of a bias voltage. The simulation is conducted under the following conditions. The modulation method is QPSK. The cutoff frequency of each low-pass filter (31a, 31i, and 31q) is 1 GHz. The chromatic dispersions that are compensated for by pre-equalization are zero, 3000 ps/nm, and 10,000 ps/nm in FIGS. 10A, 10B, and 10C, respectively.

The horizontal axis of each of the graphs illustrated in FIGS. 10A to 10C indicates a shift amount of the bias voltage with respect to the optimal point. In addition, the vertical axis indicates the power (average power) of the monitor signal (that is, the output signal of the multiplier 29).

In FIGS. 10A to 10C, each characteristic A represents the power of the monitor signal when the amplitude of the drive signal is 0.8×Vπ. In addition, each characteristic B represents the power of the monitor signal when the amplitude of the drive signal is 1.6×Vπ.

As illustrated in FIGS. 10A to 10C, when the bias voltage for the optical modulator 25 is controlled to be the optimal point, the power of the monitor signal is minimum. In addition, when a shift amount of the bias voltage with respect to the optimal point increases, the power of the monitor signal increases.

This tendency is common in the three cases illustrated in FIGS. 10A to 10C. In other words, even when the chromatic dispersion compensated for by the pre-equalization changes, the power of the monitor signal is minimum when the bias voltage is controlled to be the optimal point. In addition, in FIGS. 10A to 10C, with both the characteristic A and the characteristic B, the power of the monitor signal is minimum when the bias voltage is controlled to be the optimal point. In other words, even if the amplitude of the drive signal changes (regardless of whether the amplitude of the drive signal is higher or lower than Vπ), the power of the monitor signal is minimum when the bias voltage is controlled to be the optimal point.

Therefore, the optical transmitter 1A may appropriately control the bias voltage for the optical modulator 25 based on the power of the monitor signal. In this case, to detect the power of the monitor signal, the detecting section 30 is realized by, for example, an integrating circuit or an RF power detector. Then, the control section 26 controls the bias voltage so that the power of the monitor signal obtained by the detecting section 30 is decreased. In other words, feedback control using the monitor signal is performed. When the power of the monitor signal is minimized or substantially minimized by this feedback control, the bias voltage for the optical modulator 25 approaches the optimal point and the quality of the light signal may be improved.

Figure 2A:
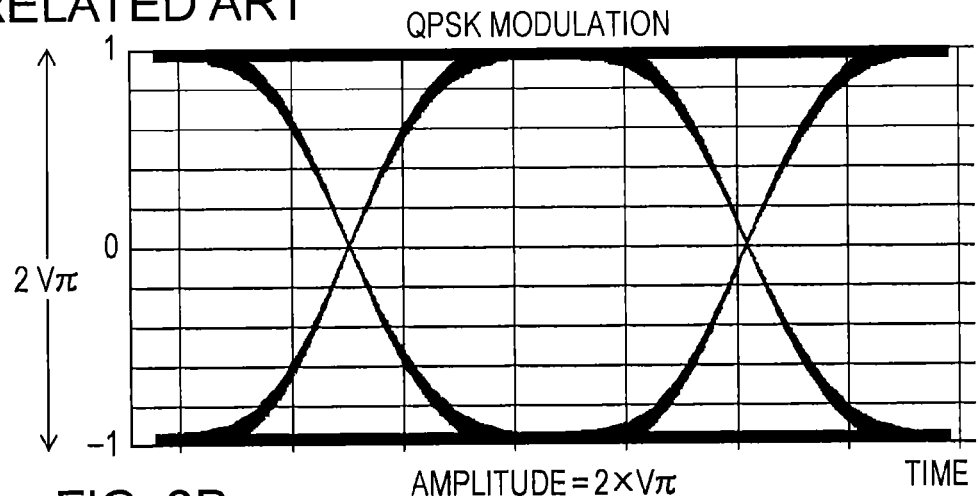
FIG. 2A is a diagram illustrating the waveform of a drive signal when the optical transmitter performs QPSK modulation.
Figure 2B:
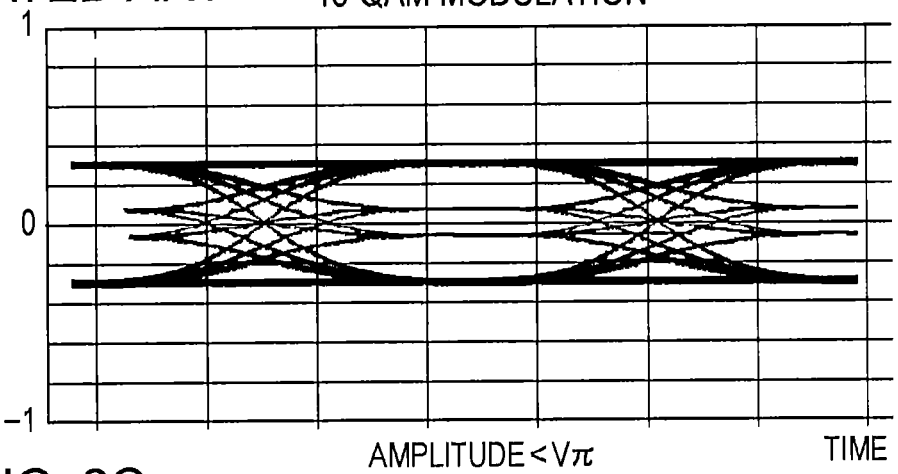
FIG. 2B is a diagram illustrating the waveform of a drive signal when the optical transmitter performs 16-QAM modulation.
Figure 2C:
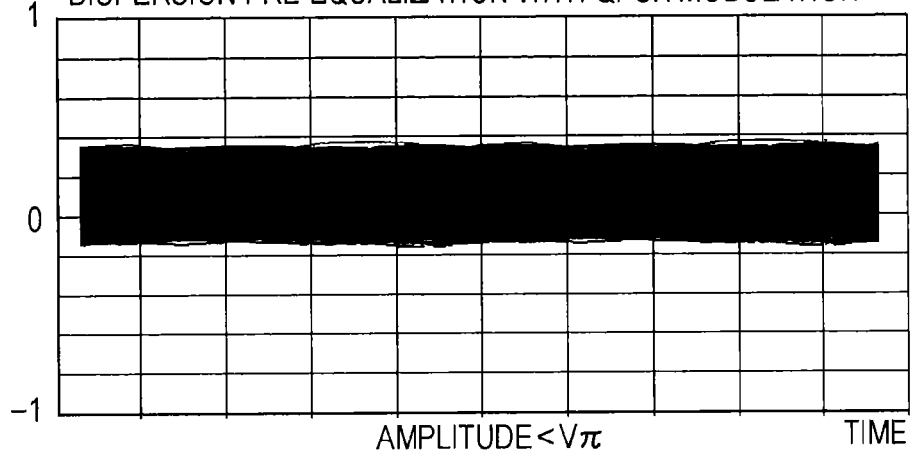
FIG. 2C is a diagram illustrating the waveform of a drive signal when the optical transmitter performs QPSK modulation and executes pre-equalization.
Figure 3:
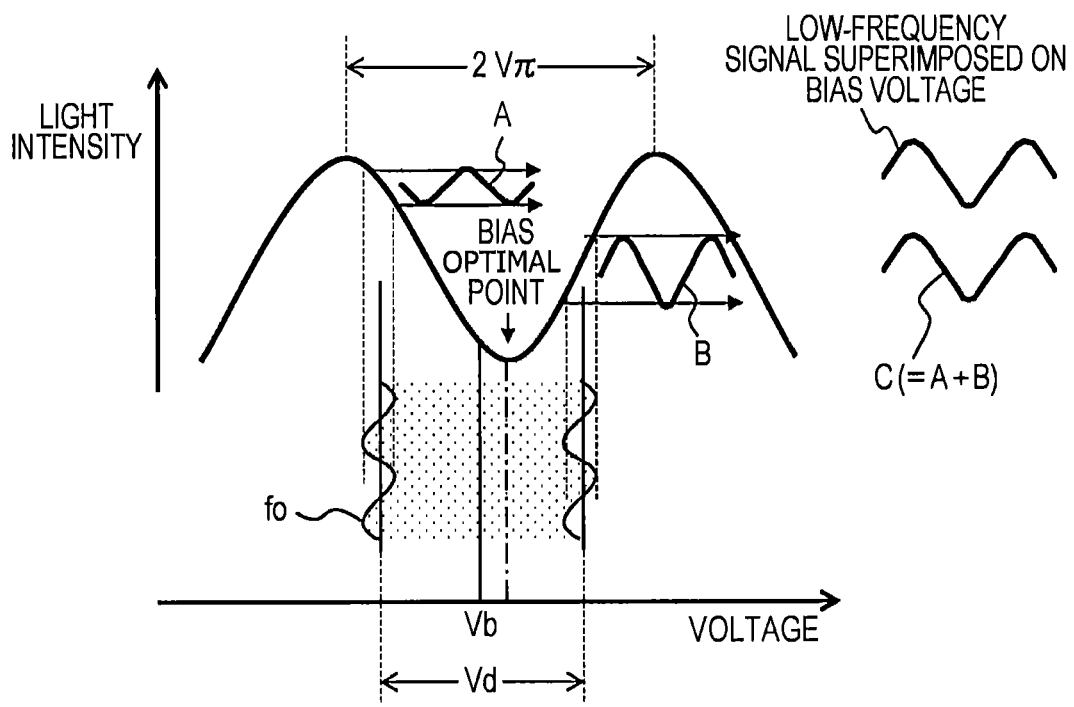
FIG. 3 is a diagram illustrating bias control of the optical modulator (Vd is greater than Vπ)
Figure 4:
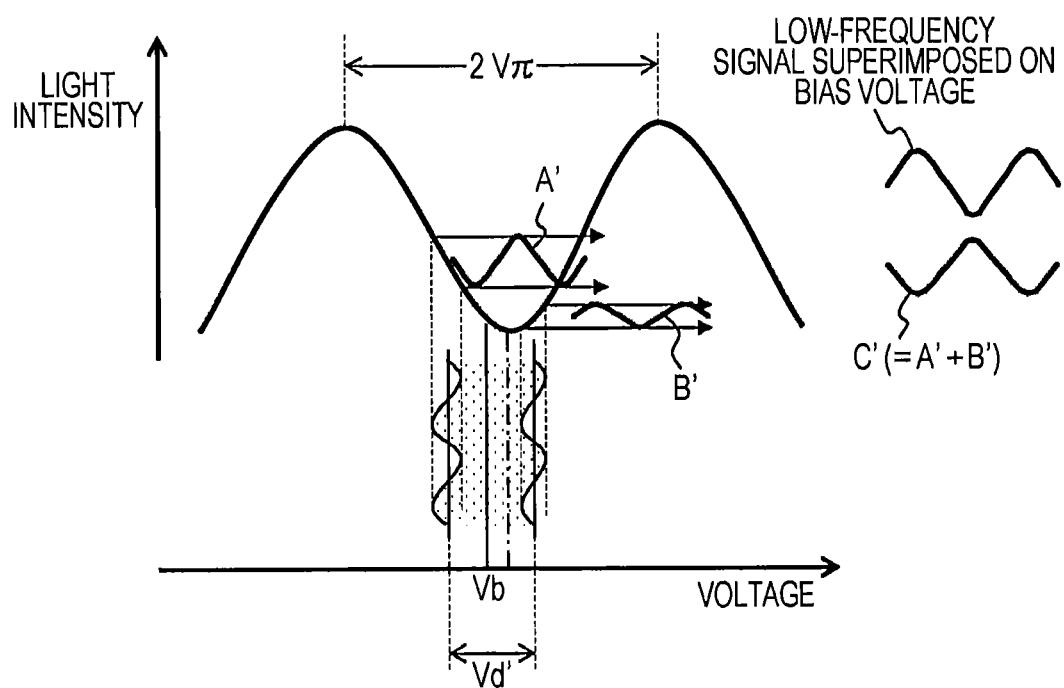
FIG. 4 is a diagram illustrating the bias control of the optical modulator (Vd' is less than Vπ)

In the related art, when the amplitude of the drive signal changes, the bias voltage for the optical modulator may possibly not be able to be appropriately controlled. For example, in the example illustrated in FIGS. 3 and 4, a bias controlling method that is used when the amplitude of the drive signal is higher than Vπ is not applicable to an operating state where the amplitude of the drive signal is lower than Vπ. In contrast, in the first embodiment, regardless of whether the amplitude of the drive signal is higher or lower than Vπ, the bias voltage for the optical modulator may be appropriately controlled. Therefore, in an optical transmitter that generates a desired light signal by digital signal processing, a bias voltage for an optical modulator may be appropriately controlled with a single bias controlling algorithm.

FIG. 11 is a flowchart illustrating another method for controlling the bias voltage for the optical modulator 25 in the optical transmitter 1A according to the first embodiment. When the control section 26 uses this flowchart, the detecting section 30 outputs the power of the monitor signal (that is, the output signal of the multiplier 29).

Processes at reference signs S11 to S18 are similar to those at S1 to S8 illustrated in FIG. 9. At S13 and S16, the control section 26 detects the power of the monitor signal. In addition, at S14, the control section 26 controls the bias voltage for the I arm so that the power of the monitor signal detected at S13 is decreased. Similarly, at S17, the control section 26 controls the bias voltage for the Q arm so that the power of the monitor signal detected at S16 is decreased.

The control section 26 periodically repeats the processes at S12 to S18. Thus, the bias voltage for the I arm of the optical modulator 25 and the bias voltage for the Q arm of the optical modulator 25 are continuously optimized or substantially optimized.

Figure 12:
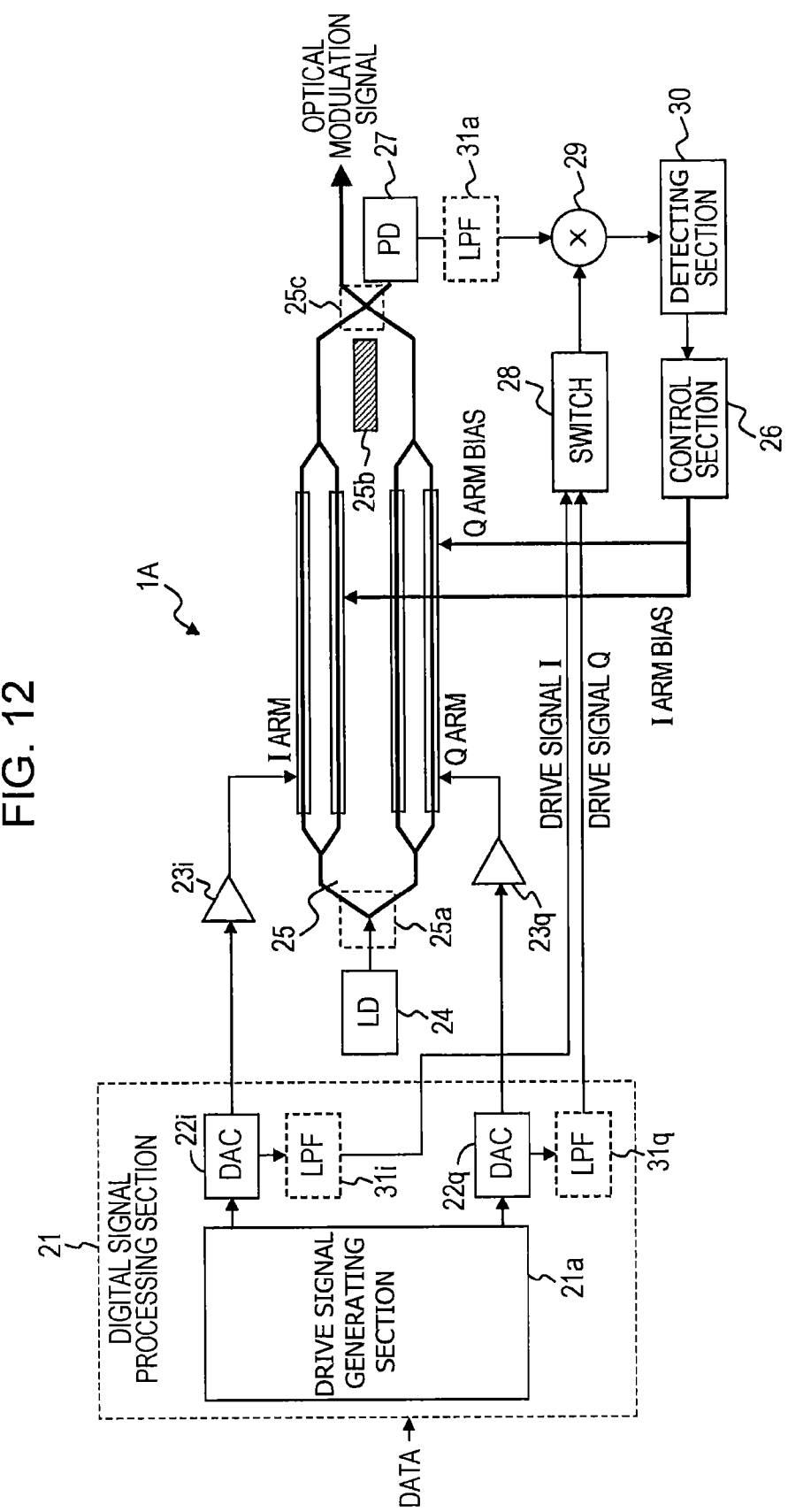
FIG. 12 is a diagram illustrating another configuration of the optical transmitter according to the first embodiment.

Although the first embodiment has been described above, the optical transmitter 1A is not limited to the configuration illustrated in FIG. 6. For example, as illustrated in FIG. 12, the drive signal generation section 21a and the DACs 22i and 22q may be mounted in a single device (here, the digital signal processing section 21). Alternatively, the drive signal generation section 21a, the DACs 22i and 22q, and the low-pass filters 31i and 31q may be mounted in a single device.

Figure 13:
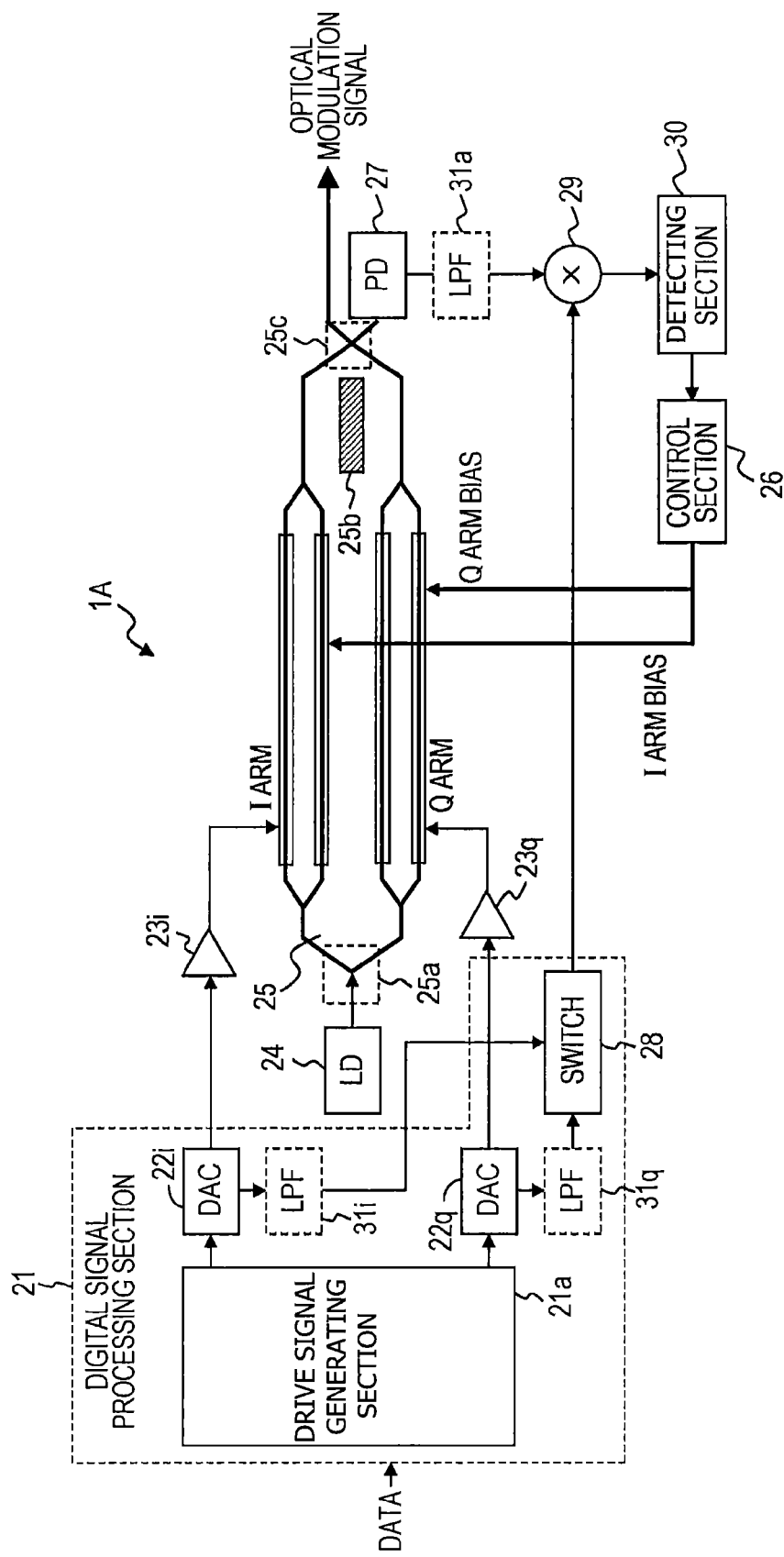
FIG. 13 is a diagram illustrating yet another configuration of the optical transmitter according to the first embodiment.

In addition, as illustrated in FIG. 13, the drive signal generation section 21a, the DACs 22i and 22q, and the switch 28 may be mounted in a single device (here, the digital signal processing section 21). Alternatively, the drive signal generation section 21a, the DACs 22i and 22q, the low-pass filters 31i and 31q, and the switch 28 may be mounted in a single device.

Furthermore, a multiplier 29 and a detecting section 30 may be provided to each of the I arm and the Q arm.

The configuration of an optical transmitter according to a second embodiment is substantially the same as that of the first embodiment. In other words, the second embodiment may be applied to the configurations illustrated in FIGS. 6, 12, and 13. However, in the second embodiment, the bias voltage for the optical modulator 25 is controlled by using a pilot signal. The pilot signal is a low-frequency signal that is sufficiently low in speed with respect to the symbol rate of the light signal, and is superimposed on the bias voltage.

Figure 14:
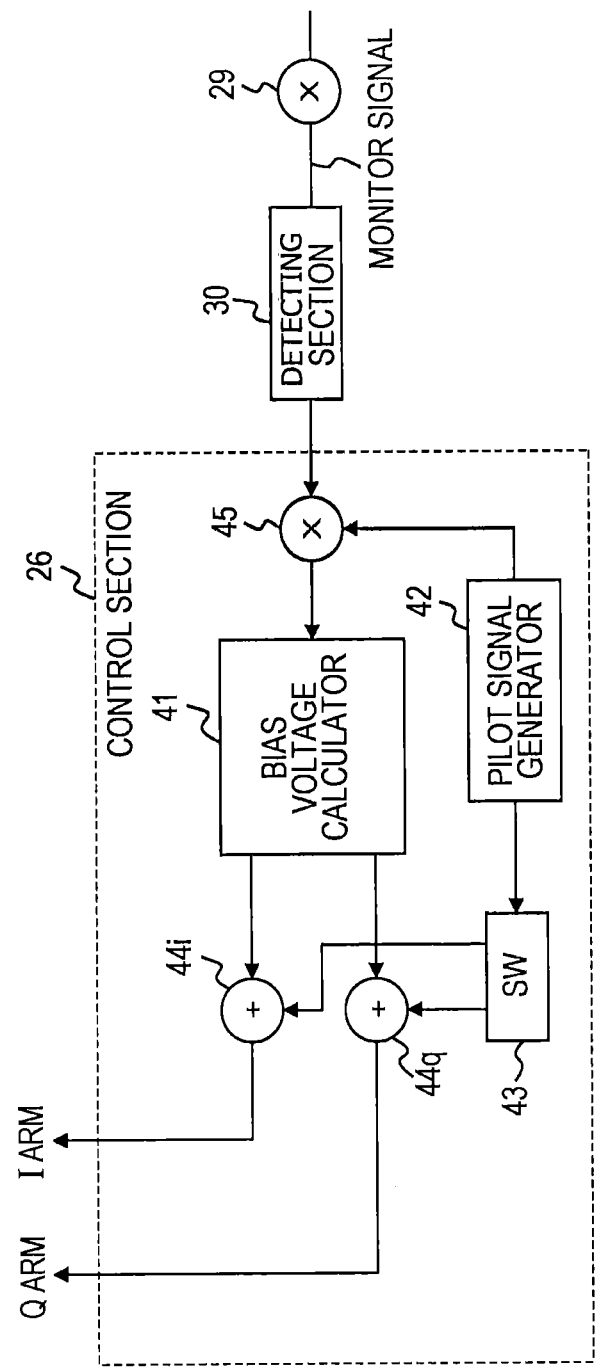
FIG. 14 is a diagram illustrating a configuration of a control section according to a second embodiment.

FIG. 14 is a diagram illustrating a configuration of a control section 26 of the optical transmitter according to the second embodiment. As illustrated in FIG. 14, the control section 26 according to the second embodiment includes a bias voltage calculator 41, a pilot signal generator 42, a switch 43, superimposers 44i and 44q, and a synchronous detector 45.

The bias voltage calculator 41 calculates an I arm bias voltage and a Q arm bias voltage for the optical modulator 25.

The pilot signal generator 42 generates a pilot signal. The pilot signal is, for example, a sine-wave signal. In this case, the frequency of the sine wave is sufficiently low as compared to the symbol rate of the light signal. The switch 43 guides the pilot signal to the superimposer 44i or 44q. The superimposers 44i and 44q superimpose the pilot signal on the I arm bias voltage and the Q arm bias voltage, respectively.

When the I arm bias voltage is controlled, the switch 43 guides the pilot signal to the superimposer 44i. Then, the superimposer 44i superimposes the pilot signal on the I arm bias voltage. At this point, the pilot signal is not superimposed on the Q arm bias voltage. Conversely, when the Q arm bias voltage is controlled, the switch 43 guides the pilot signal to the superimposer 44q. Then, the superimposer 44q superimposes the pilot signal on the Q arm bias voltage. At this point, the pilot signal is not superimposed on the I arm bias voltage.

When the pilot signal is superimposed on a bias voltage, the light signal output from the optical modulator 25 includes a frequency component of the pilot signal. Thus, the monitor signal generated by the multiplier 29 includes the frequency component of the pilot signal. Here, the detecting section 30 detects the power of the monitor signal. In this case, the input signal of the control section 26 (that is, a signal representing the power of the monitor signal) also includes the frequency component of the pilot signal.

The synchronous detector 45 detects the pilot signal component from the signal representing the power of the monitor signal, by multiplying the pilot signal by the input signal. Then, the bias voltage calculator 41 controls the bias voltage based on the pilot signal component detected by the synchronous detector 45. For example, the bias voltage calculator 41 controls the bias voltage so that the detected pilot signal component is decreased. At this point, the bias voltage calculator 41 may determine whether to increase or decrease the bias voltage, by comparing the phase of the pilot signal generated by the pilot signal generator 42 with the phase of the detected pilot signal component.

In the second embodiment, the bias voltage may be controlled by using two pilot signals having different frequencies (the pilot signal generator and the synchronous detector). In this case, each pilot signal is superimposed on the I arm bias voltage or the Q arm bias voltage. According to this configuration, the I arm bias voltage and the Q arm bias voltage may be controlled simultaneously or in parallel.

According to the second embodiment, the detection sensitivity to the monitor signal may be increased. As a result, the bias voltage for the optical modulator 25 may be controlled with improved accuracy.

Figure 15:
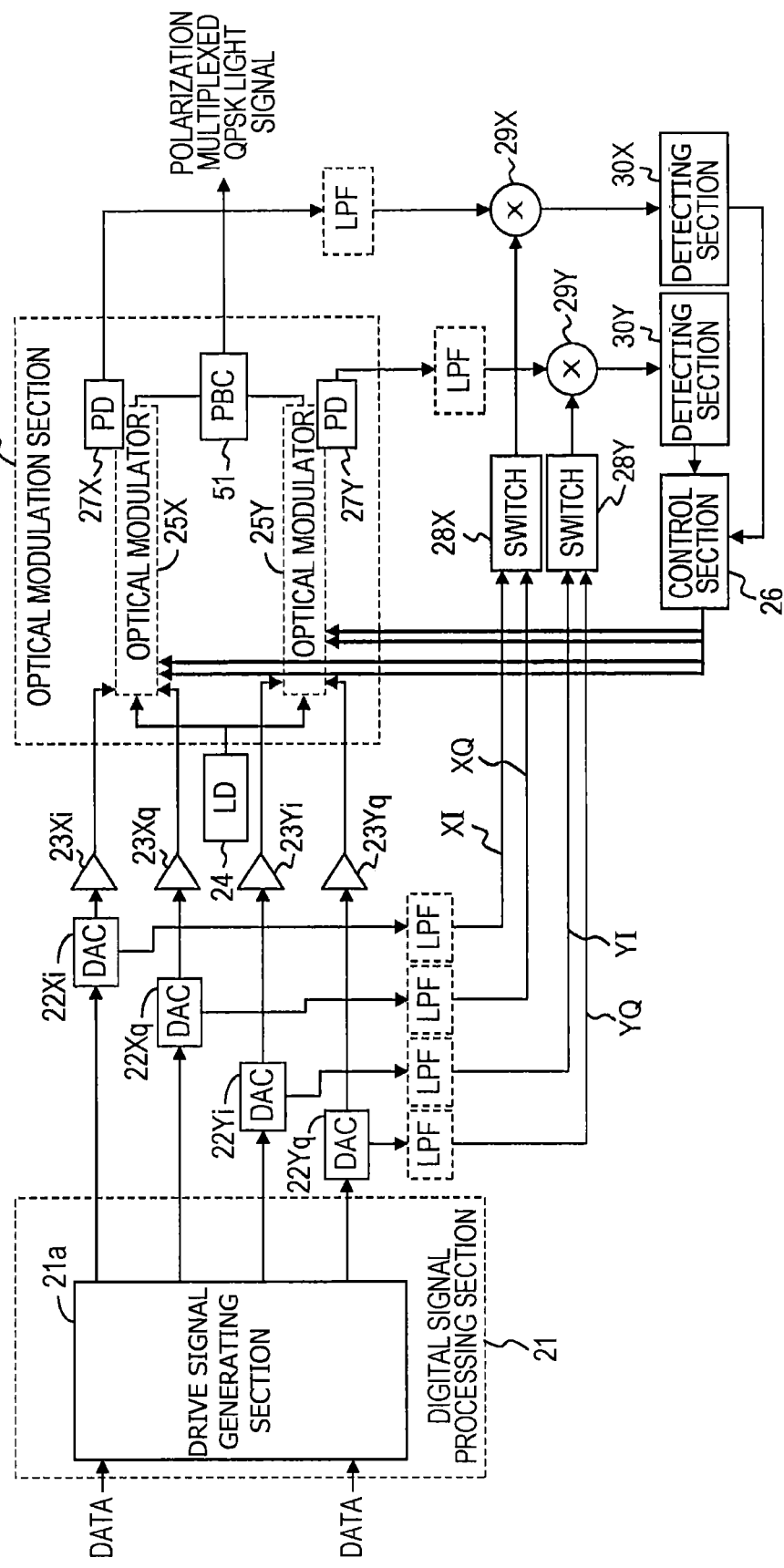
FIG. 15 is a diagram illustrating a configuration of an optical transmitter according to a third embodiment.

FIG. 15 illustrates a configuration of an optical transmitter according to a third embodiment. The optical transmitter 1B according to the third embodiment transmits a polarization-division multiplexed light signal.

As illustrated in FIG. 15, the optical transmitter 1B includes a digital signal processing section 21, DACs 22Xi, 22Xq, 22Yi, and 22Yq, amplifiers 23Xi, 23Xq, 23Yi, and 23Yq, a light source (LD) 24, an optical modulation section 50, a control section 26, photodetectors (PD) 27X and 27Y, switches 28X and 28Y, multipliers 29X and 29Y, and detecting sections 30X and 30Y.

The digital signal processing section 21 includes a drive signal generation section 21a and generates drive signals XI, XQ, YI, and YQ. The drive signal XI is converted by the DAC 22Xi into an analog signal, amplified by the amplifier 23Xi, and then provided to the optical modulation section 50; the drive signal XQ is converted by the DAC 22Xq into an analog signal, amplified by the amplifier 23Xq, and then provided to the optical modulation section 50. Similarly the drive signal YI is converted by the DAC 22Yi into an analog signal, amplified by the amplifier Yi, and then provided to the optical modulation section 50; the drive signal YQ is converted by the DAC 22Yq into an analog signal, amplified by the amplifier Yq, and then provided to the optical modulation section 50.

The optical modulation section 50 includes optical modulators 25X and 25Y, and a polarized beam combiner (PBC) 51. Each of the optical modulators 25X and 25Y is substantially the same as the optical modulator 25 of the first embodiment. However, the optical modulator 25X generates a light signal X with the drive signals XI and XQ. In addition, the optical modulator 25Y generates a light signal Y with the drive signals YI and YQ. Then, the polarized beam combiner 51 uses polarization-division multiplexing to multiplex the light signal X and the light signal Y and generate a polarization-division multiplexed light signal.

The photodetector 27X, the switch 28X, the multiplier 29X, the detecting section 30X are substantially the same as the photodetector 27, the switch 28, the multiplier 29, and the detecting section 30 of the first embodiment. However, the photodetector 27X, the switch 28X, the multiplier 29X, and the detecting section 30X output both a result (a monitor signal XI) of multiplying the drive signal XI and an electric signal representing the light signal X, and a result (a monitor signal XQ) of multiplying the drive signal XQ and the electric signal representing the light signal X.

The photodetector 27Y, the switch 28Y, the multiplier 29Y, and the detecting section 30Y are also substantially the same as the photodetector 27, the switch 28, the multiplier 29, and the detecting section 30 of the first embodiment. However, the photodetector 27Y, the switch 28Y, the multiplier 29Y, and the detecting section 30Y output both a result (a monitor signal YI) of multiplying the drive signal YI and an electric signal representing the light signal Y as well as a result (a monitor signal YQ) of multiplying the drive signal YQ and the electric signal representing the light signal Y.

The control section 26 controls a bias voltage for the I arm of the optical modulator 25X, based on the monitor signal XI, and controls a bias voltage for the Q arm of the optical modulator 25X, based on the monitor signal XQ. Similarly, the control section 26 controls a bias voltage for the I arm of the optical modulator 25Y, based on the monitor signal YI, and controls a bias voltage for the Q arm of the optical modulator 25Y, based on the monitor signal YQ.

The optical transmitter 1B may include low-pass filters (LPF) for filtering the drive signals XI, XQ, YI, and YQ, respectively. In addition, the optical transmitter 1B may include low-pass filters (LPF) for filtering the output signals of the photodetectors 27X and 27Y, respectively.

Figure 16:
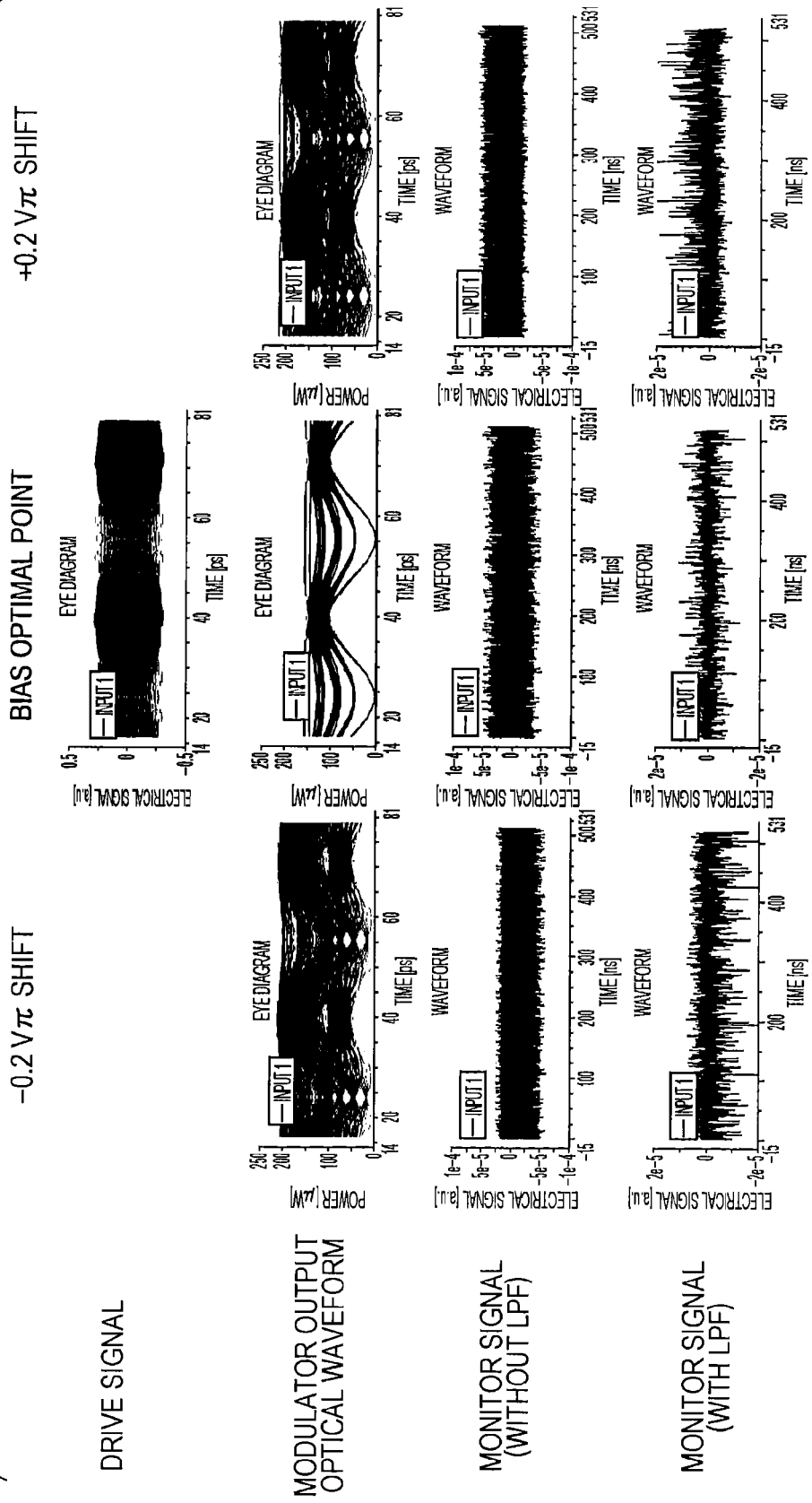
FIG. 16 is a diagram illustrating a simulation result regarding change of a monitor signal with respect to shift of a bias voltage (part 1)
Figure 17:
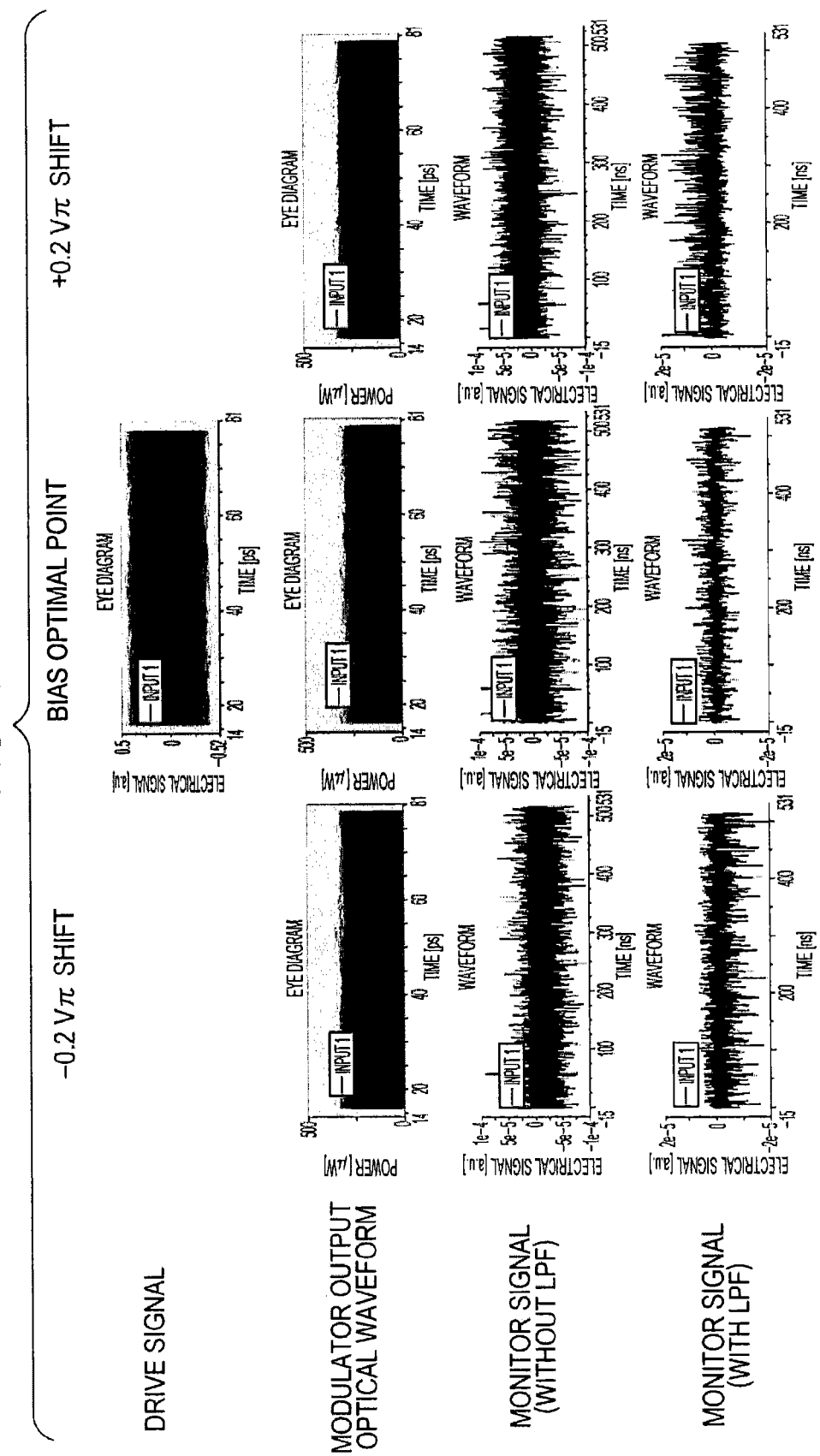
FIG. 17 is a diagram illustrating a simulation result regarding change of a monitor signal with respect to shift of a bias voltage (part 2)

FIGS. 16 and 17 each illustrate a simulation result regarding change of a monitor signal with respect to shift of the bias voltage in the third embodiment. The conditions of this simulation are as follows.

Modulation method: DP-QPSK
Polarization rotation: 30 degrees
Amplitude of drive signal: $0.8 \times V\pi$
Chromatic dispersion (FIG. 16): 0 ps/nm
Chromatic dispersion (FIG. 17): 10,000 ps/nm In FIGS. 16 and 17, a drive signal indicates one of the drive signals XI, XQ, YI, or YQ (for example, the drive signal XI). In addition, an optical waveform indicates the waveform of either the light signal X or the light signal Y (for example, the light signal X). The monitor signal indicates the output signal of either the multiplier 29X or 29Y (for example, the multiplier 29X).

As illustrated in FIGS. 16 and 17, in the third embodiment as well, when the bias voltage is controlled to be an optimal point, the center level of the monitor signal is "zero". In addition, when the bias voltage shifts from the optimal point, the center level of the monitor signal also shifts from "zero". At this point, the direction in which the center level of the monitor signal shifts depends on the direction in which the bias voltage shifts. These tendencies are the same between when pre-equalization is performed and when pre-equalization is not performed.

Therefore, similarly to the first embodiment, the optical transmitter 1B according to the third embodiment controls the bias voltage so that the center level of the monitor signal approaches zero. In other words, feedback control using the monitor signal is performed. Then, when the center level of each monitor signal approaches zero by this feedback control, each of the bias voltages for the optical modulators 25X and 25Y approaches the optimal point and the quality of the polarization-division multiplexed light signal may be improved.

Figure 18A:
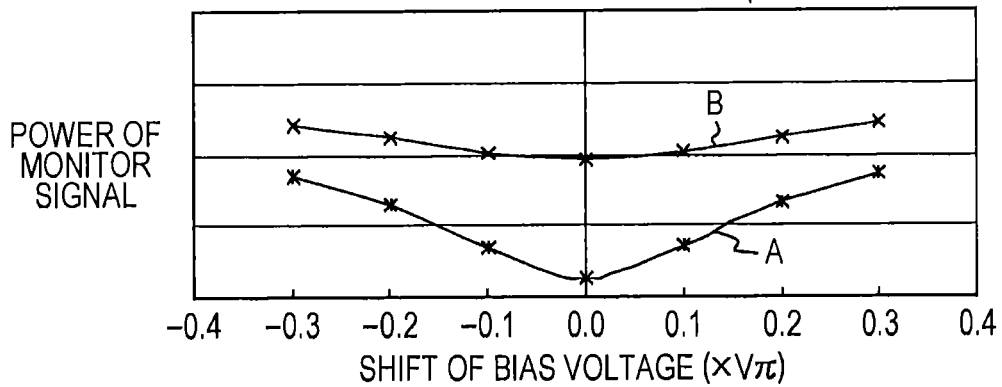
FIGS. 18A to 18C are diagrams illustrating a simulation result regarding the power of a monitor signal with respect to shift of a bias voltage.
Figure 18B:
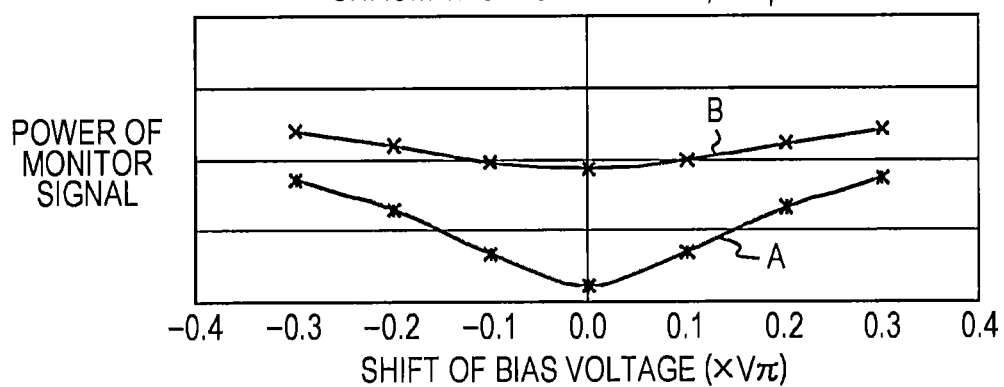
Figure 18C:
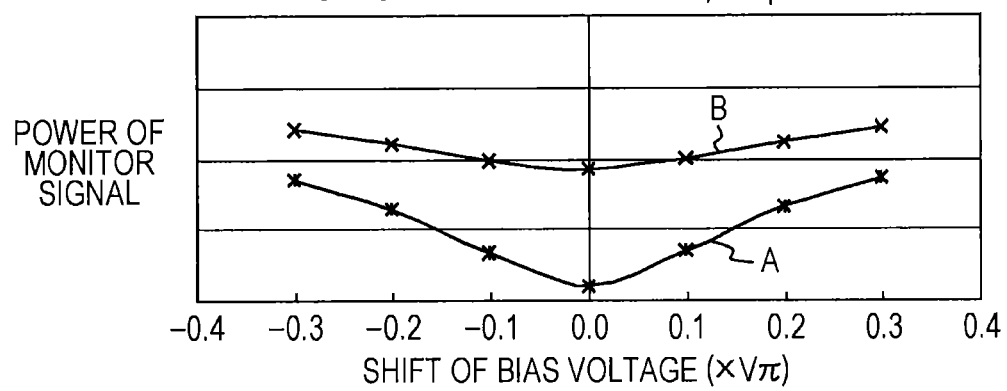

FIGS. 18A to 18C each illustrate a result of a simulation regarding the power of a monitor signal with respect to shift of the bias voltage in the third embodiment. The conditions of this simulation are as follows.

Modulation method: DP-QPSK
Polarization rotation: 30 degrees
Cutoff frequency of low-pass filter (LPF): 1 GHz
Amplitude of drive signal: $0.8 \times V\pi$, $1.6 \times V\pi$
Chromatic dispersion (FIG. 18A): 0 ps/nm
Chromatic dispersion (FIG. 18B): 3000 ps/nm
Chromatic dispersion (FIG. 18C): 10,000 ps/nm As illustrated in FIGS. 18A to 18C, in any of the cases, when the bias voltage for the optical modulator is controlled to an optimal point, the power of the monitor signal is minimum. In addition, when a shift amount of the bias voltage with respect to the optimal point increases, the power of the monitor signal increases.

Therefore, similarly to the first embodiment, the optical transmitter 1B according to the third embodiment controls the bias voltage so that the power of the monitor signal is decreased. In other words, feedback control using the monitor signal is performed. Then, when the power of each monitor signal is minimized or substantially minimized by this feedback control, each of the bias voltages for the optical modulators 25X and 25Y approaches the optimal point and the quality of the light signal may be improved.

Figure 19:
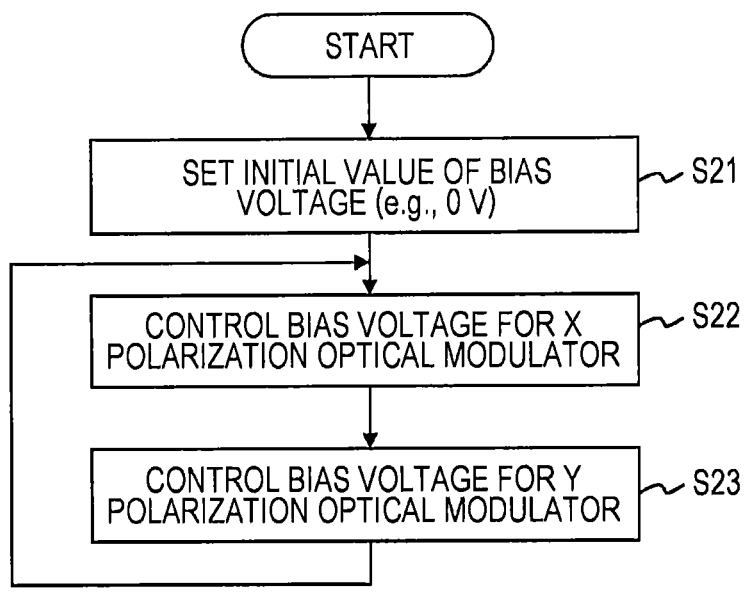
FIG. 19 is a flowchart illustrating a bias controlling method according to the third embodiment.

FIG. 19 is a flowchart illustrating a bias controlling method according to the third embodiment. This flowchart is executed by the control section 26 of the optical transmitter 1B.

At reference sign S21, the control section 26 sets an initial value of each bias voltage. The initial value is, for example, 0 volts. In this case, the control section 26 sets the bias voltages for the I arm and the Q arm of the optical modulator 25X to zero, and also sets the bias voltages for the I arm and the Q arm of the optical modulator 25Y to zero.

At S22, the control section 26 controls the bias voltage for the optical modulator 25X. At S23, the control section 26 controls the bias voltage for the optical modulator 25Y. The order of execution of S22 and S23 is not a particular limitation, and S23 may be executed prior to S22.

Each of S22 and S23 is realized by, for example, S2 to S8 illustrated in FIG. 9. In this case, at S22, the processes at S2 to S8 are executed for the optical modulator 25X. In addition, at S23, the processes at S2 to S8 are executed for the optical modulator 25Y.

Alternatively, each of S22 and S23 is realized by S12 to S18 illustrated in FIG. 11. In this case, at S22, the processes at S12 to S18 are executed for the optical modulator 25X. In addition, at S23, the processes at S12 to S18 are executed for the optical modulator 25Y.

The control section 26 of the optical transmitter 1B periodically repeats the processes at S22 and S23. Thus, the bias voltages for the optical modulators 25X and 25Y are continuously optimized or substantially optimized. As a result, the quality of the polarization-division multiplexed light signal transmitted from the optical transmitter 1B may be maintained in a favorable state.

Figure 20:
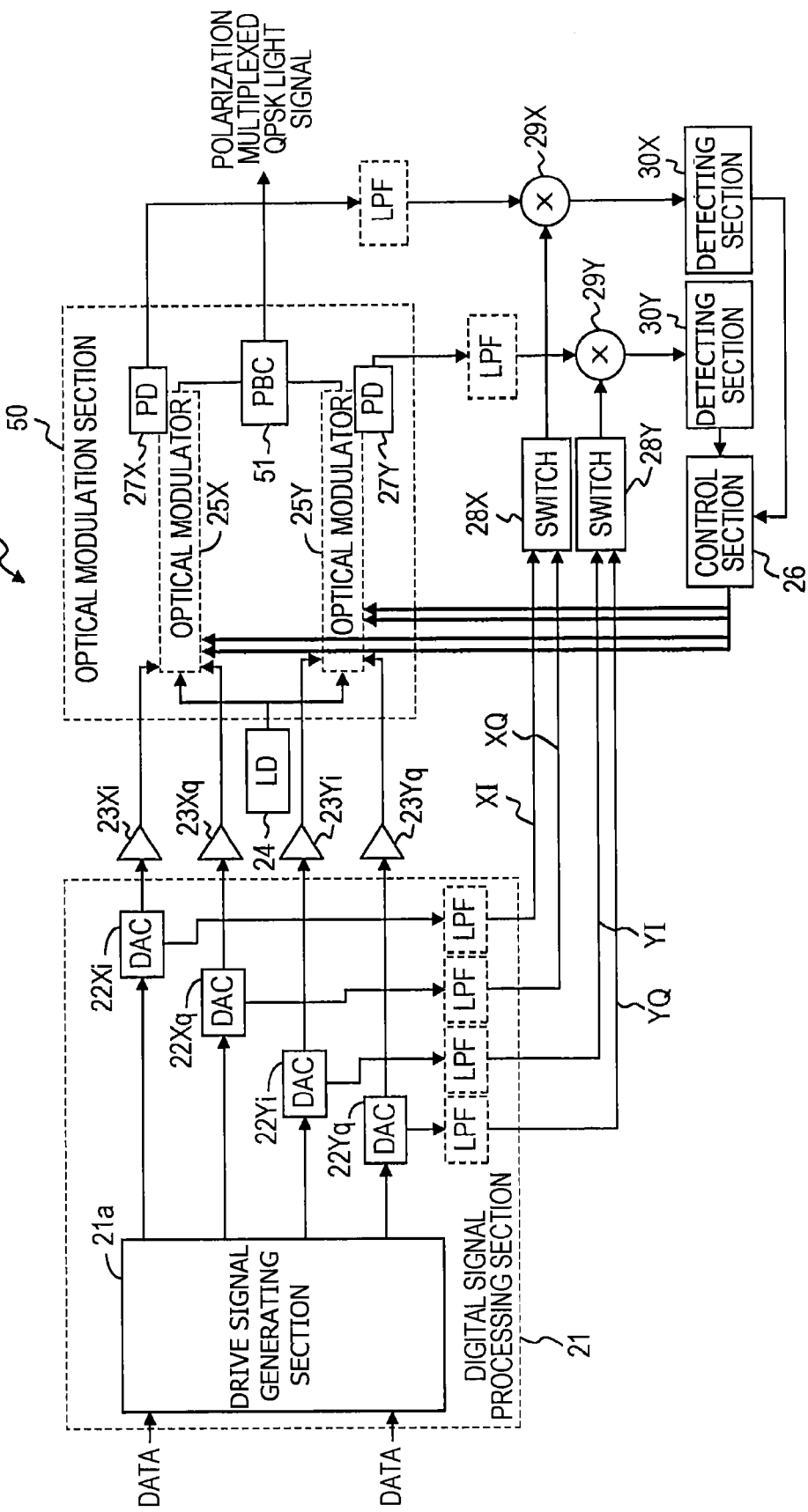
FIG. 20 is a diagram illustrating another configuration of the optical transmitter according to the third embodiment.

Although the third embodiment has been described above, the optical transmitter 1B is not limited to the configuration illustrated in FIG. 15. For example, as illustrated in FIG. 20, the drive signal generation section 21a and the DACs 22Xi, 22Xq, 22Yi, and 22Yq may be mounted in a single device (here, the digital signal processing section 21). Alternatively, the drive signal generation section 21a, the DACs 22Xi, 22Xq, 22Yi, and 22Yq, and the corresponding low-pass filters (LPF) may be mounted in a single device.

Figure 21:
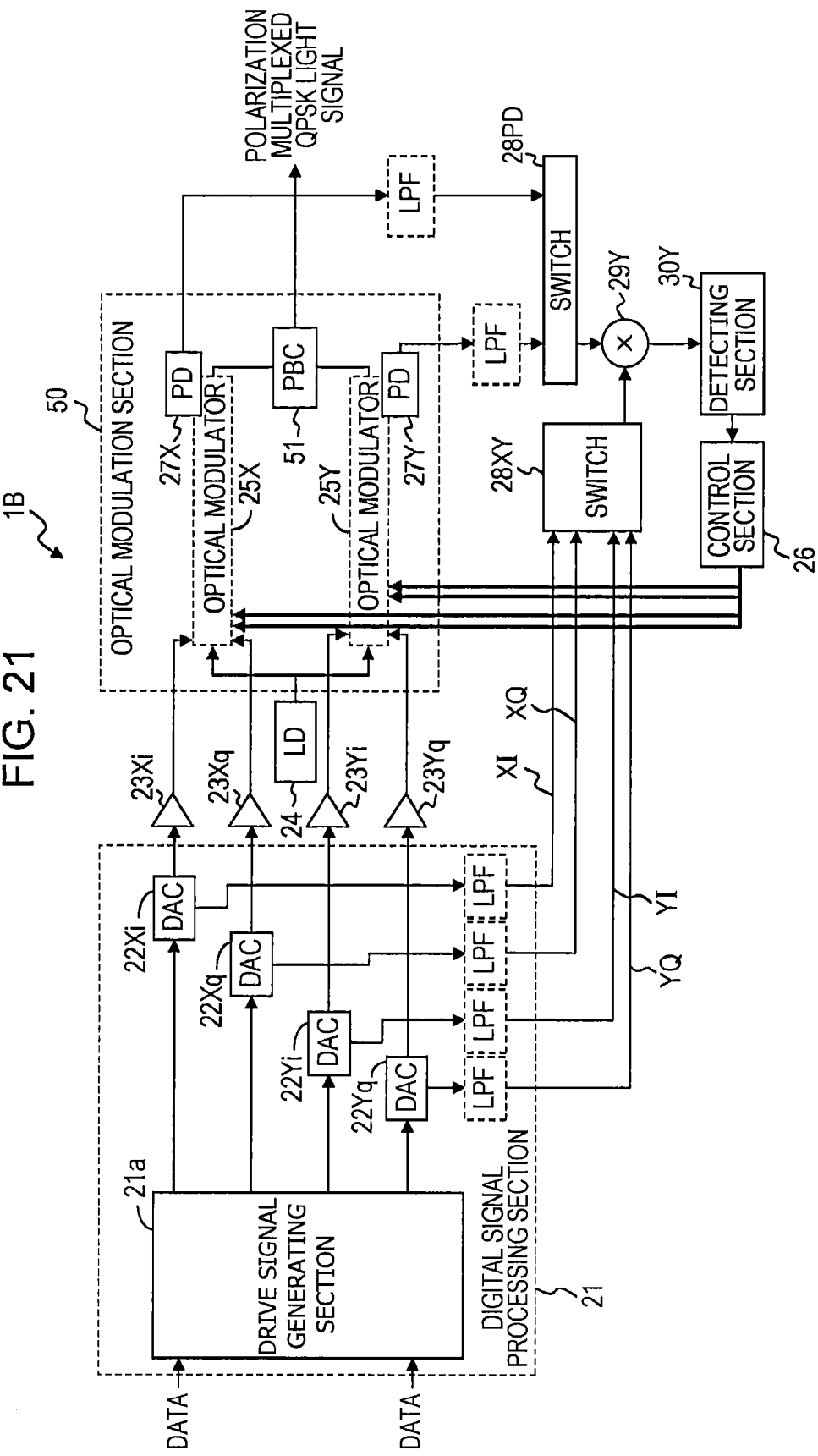
FIG. 21 is a diagram illustrating another configuration of the optical transmitter according to the third embodiment.

FIG. 21 is a diagram illustrating another configuration of the optical transmitter according to the third embodiment.

In FIG. 20, a switch 28X that selects from each of the drive signals output from the DACs 22Xi and 22Xq via the LPFs, and a switch 28Y that selects output from each of the LPFs that receive inputs of the drive signals output from the DACs 22Yi and 22Yq are provided.

As illustrated in FIG. 21, each LPF receives input of each of the drive signals output from the DACs 22Xi, 22Xq, 22Yi, and 22Yq. A switch 28XY that selects a signal output from each LPF is provided; the switch 28XY selects an input signal in accordance with control from the control section 26. The signal selected by the switch 28XY is input into a first port of the multiplier 29Y.

Each of the output signals that are output from the photodetector 27X and the photodetector 27Y is input via a corresponding LPF into a switch 28PD. The switch 28PD selects one of the input output signals and outputs the selected signal to a second port of the multiplier 29Y.

The multiplier 29Y multiplies the signals input into the first port and the second port and outputs the resultant signal to the detecting section 30Y. The other configuration is the same as that in description given for the first embodiment, and thus the description thereof is omitted.

Figure 22:
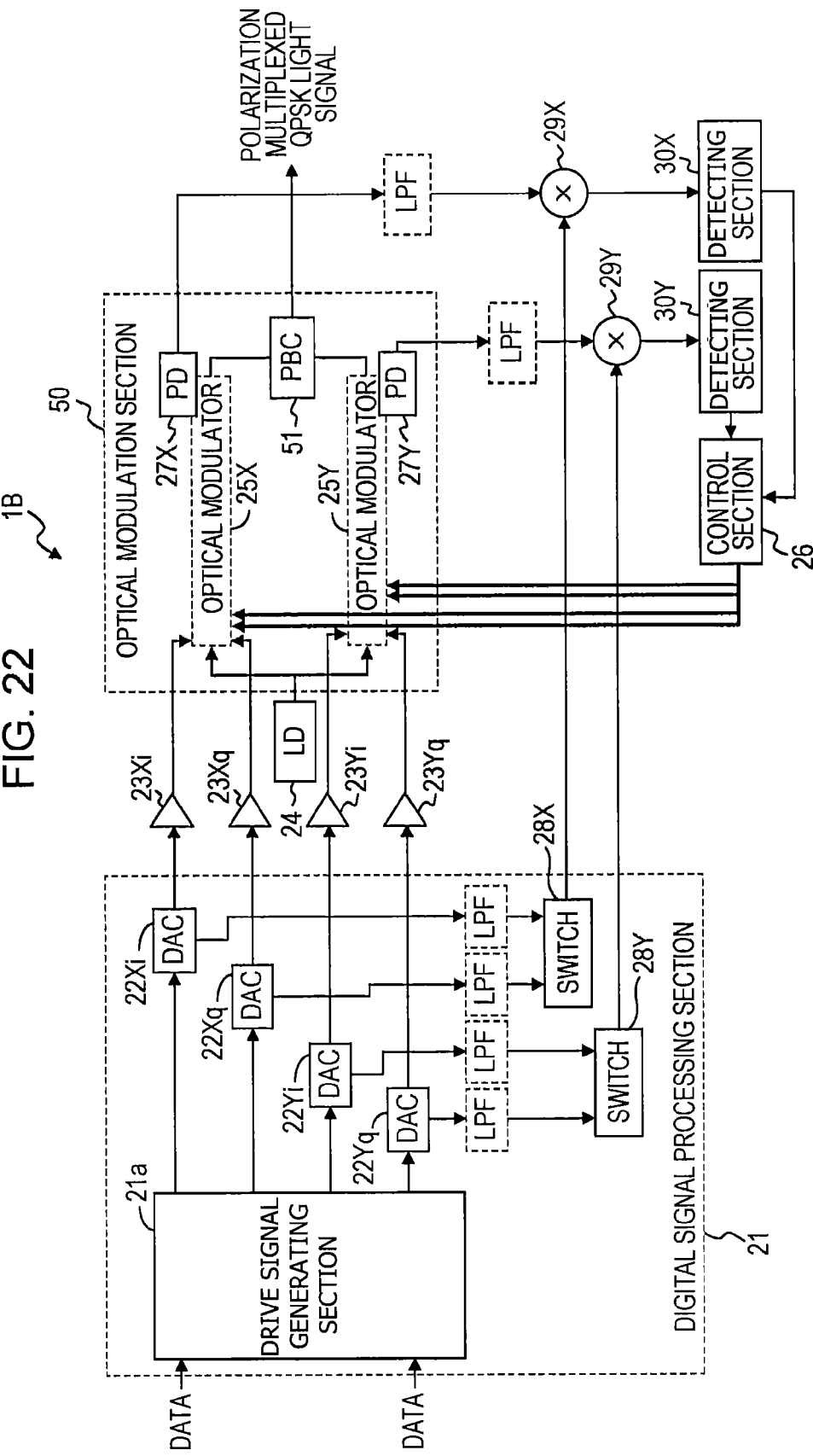
FIG. 22 is a diagram illustrating yet another configuration of the optical transmitter according to the third embodiment.

In addition, as illustrated in FIG. 22, the drive signal generation section 21a, the DACs 22Xi, 22Xq, 22Yi, and 22Yq, and the switches 28X and 28Y may be mounted in a single device (here, the digital signal processing section 21). Alternatively, the drive signal generation section 21a, the DACs 22Xi, 22Xq, 22Yi, and 22Yq, the corresponding low-pass filters (LPF), and the switches 28X and 28Y may be mounted in a single device.

Furthermore, the detecting sections 30X and 30Y may be realized by a single detecting section 30. In this case, a switch that selects the output signals of the multipliers 29X and 29Y is provided on the input side of the detecting section 30. Then, the monitor signal selected by the switch is input into the detecting section 30.

Moreover, when a switch that selects the drive signals XI, XQ, YI, and YQ and a switch that selects the output signals of the photodetectors 27× and 27Y are provided, each bias voltage may be controlled with a single multiplier and a single detecting section.

The second embodiment and the third embodiment may be combined. In other words, the optical transmitter 1B according to the third embodiment may control each bias voltage by using the pilot signal of the second embodiment.

An optical transmitter according to a fourth embodiment has a function to suppress 1/f noise. This function may be applied to the optical transmitter according to the first embodiment and the optical transmitter according to the second embodiment. Hereinafter, a configuration in which the function to suppress 1/f noise is added to the optical transmitter according to the first embodiment will be described.

Figure 23:
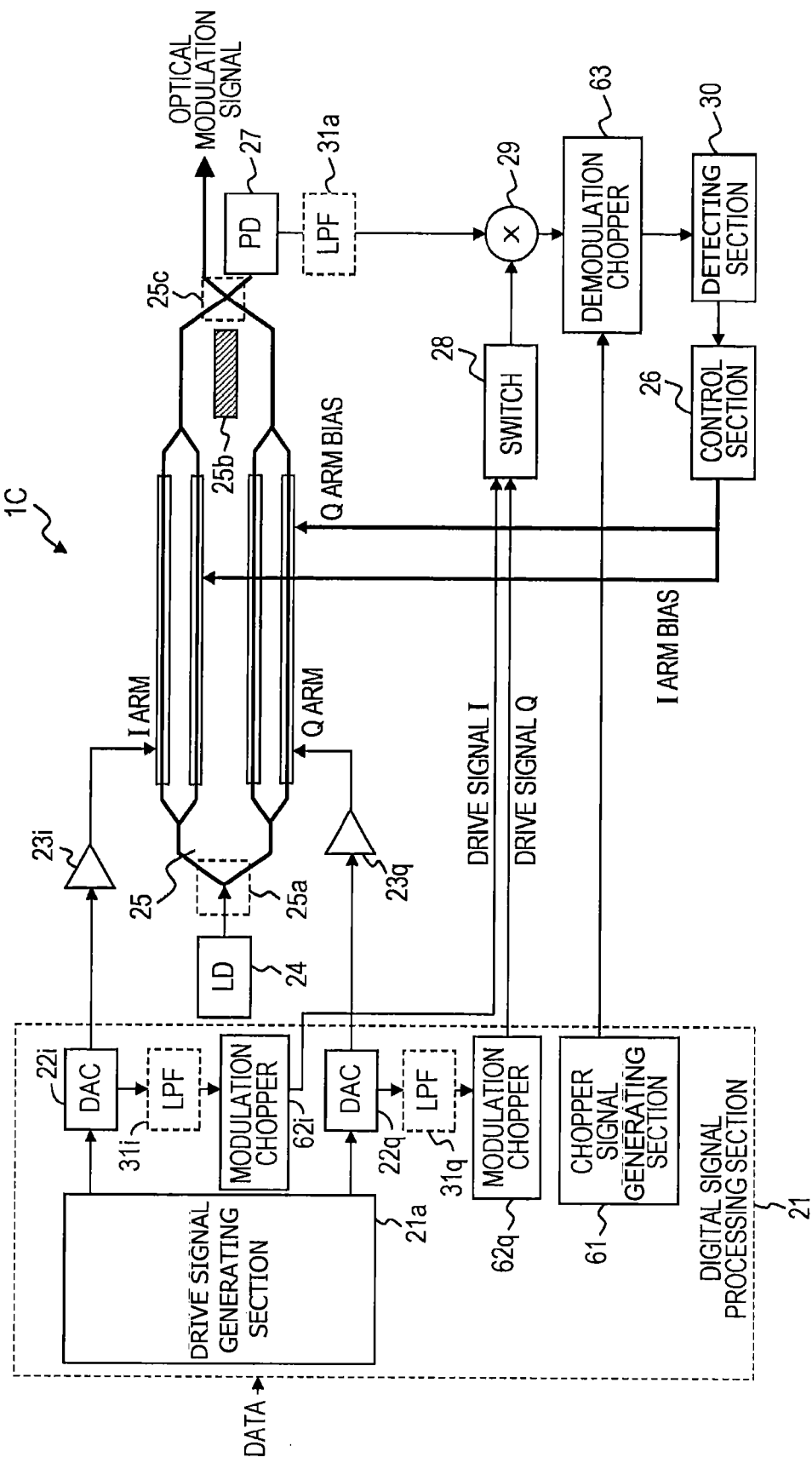
FIG. 23 is a diagram illustrating a configuration of an optical transmitter according to a fourth embodiment.

FIG. 23 illustrates a configuration of the optical transmitter according to the fourth embodiment. In addition to each component of the optical transmitter 1A illustrated in FIG. 6, 12, or 13, the optical transmitter 1C illustrated in FIG. 23 includes a chopper signal generation section 61, modulation choppers 62$i$ and 62$q$, and a demodulation chopper 63.

The chopper signal generation section 61 generates a chopper signal of a given frequency. The frequency of the chopper signal is preferably lower than the cutoff frequencies of the low-pass filters (LPF) 31$i$ and 31$q$.

The modulation chopper 62$i$ modulates the drive signal I, which has been filtered by the low-pass filter 31$i$, with the chopper signal. That is, the modulation chopper 62$i$ turns the drive signal I on and off with the cycle of the chopper signal. In addition, the modulation chopper 62$q$ modulates the drive signal Q, which has been filtered by the low-pass filter 31$q$, with the chopper signal. That is, the modulation chopper 62$q$ turns the drive signal Q on and off with the cycle of the chopper signal.

The switch 28 selects the modulated drive signal I or the modulated drive signal Q in accordance with an instruction from the control section 26. Thus, when controlling the bias for the I arm, the multiplier 29 multiplies the modulated drive signal I and the electric signal representing the light signal to generate a monitor signal. In addition, when controlling the bias for the Q arm, the multiplier 29 multiplies the modulated drive signal Q and the electric signal representing the light signal to generate a monitor signal. Then, the demodulation chopper 63 demodulates the monitor signal output from the multiplier 29, using the chopper signal.

The detecting section 30 detects the power of the monitor signal demodulated by the demodulation chopper 63. Then, the control section 26 controls the bias voltage for the optical modulator 25 based on the output of the detecting section 30.

According to the above configuration, influence of 1/f noise is suppressed in a feedback system that controls the bias voltage for the optical modulator 25. Thus, the bias voltage for the optical modulator 25 may be controlled with improved accuracy and the quality of the generated light signal may be improved.

In the first to fourth embodiments, the control section 26, which controls the bias voltage for the optical modulator 25 (25X, 25Y), may be realized as a part of the digital signal processing section 21. According to this configuration, the size of the optical transmitter may be reduced.

As an advantageous effect of the present invention, according to the embodiments described above, is the realization of an optical transmitter which may generate a high-quality light signal even when a drive condition of an optical modulator changes.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmitter, comprising:
    a signal generator configured to generate a drive signal from input data;
    an optical modulator configured to have a voltage-to-light-intensity characteristic in which intensity of output light changes in response to an applied voltage, and to generate a light signal that corresponds to the drive signal;
    a multiplier configured to multiply the drive signal and an electric signal that is obtained from the light signal; and
    a control section configured to control, based on an output of the multiplier, a bias voltage for the optical modulator so that the output of an averaging device approaches zero.

2. The optical transmitter according to claim 1, further comprising:
    a first low-pass filter configured to filter the drive signal; and
    a second low-pass filter configured to filter the electric signal, wherein
    the multiplier multiplies the drive signal filtered by the first low-pass filter and the electric signal filtered by the second low-pass filter and outputs a signal.

3. The optical transmitter according to claim 1, wherein the averaging device is configured to average an output signal of the multiplier, and
    the control section controls, based on the output of the averaging device, the bias voltage for the optical modulator.

4. The optical transmitter according to claim 1, further comprising a power detector configured to detect power of an output signal of the multiplier, wherein
    the control section controls, based on an output of the power detector, the bias voltage for the optical modulator.

5. The optical transmitter according to claim 4, wherein the control section controls the bias voltage for the optical modulator so that the power detected by the power detector is decreased.

6. The optical transmitter according to claim 1, wherein the optical modulator includes an I arm and a Q arm,
    the signal generator generates a drive signal for the I arm and a drive signal for the Q arm, and
    the control section controls a bias voltage for the I arm of the optical modulator, based on a signal obtained by the multiplier multiplying the drive signal for the I arm with an electric signal that represents the light signal, and controls a bias voltage for the Q arm of the optical modulator, based on a signal obtained by the multiplier multiplying the drive signal for the Q arm with the electric signal that represents the light signal.

7. The optical transmitter according to claim 1, further comprising a superimposer configured to superimpose a pilot signal on the bias voltage for the optical modulator, wherein
    the control section controls the bias voltage for the optical modulator, based on a frequency component of the pilot signal included in an output signal of the multiplier.

8. The optical transmitter according to claim 1, further comprising:
    a modulation circuit configured to modulate the drive signal with a given frequency; and
    a demodulation circuit configured to demodulate an output signal of the multiplier with the given frequency, wherein the multiplier multiplies the drive signal modulated by the modulation circuit with an electric signal that represents the light signal, and the control section controls the bias voltage for the optical modulator, based on the multiplier's output signal that is demodulated by the demodulation circuit.

9. An optical transmitter, comprising:

a signal generator configured to generate a first drive signal and a second drive signal from input data;

a first optical modulator configured to have a voltage-to-light-intensity characteristic in which intensity of output light changes with respect to an applied voltage, and to generate a first light signal corresponding to the first drive signal;

a second optical modulator configured to have a voltage-to-light-intensity characteristic in which intensity of output light changes with respect to an applied voltage, and to generate a second light signal corresponding to the second drive signal;

a combiner configured to multiplex the first light signal and the second light signal to generate a polarization-division multiplexed light signal;

a first multiplier configured to respectively multiply first and second component signals of the first drive signal and a first electric signal that represents the first light signal;

a second multiplier configured to respectively multiply first and second component signals of the second drive signal and a second electric signal that represents the second light signal; and a control section configured to control, based on an output of the first multiplier, a bias voltage for the first optical modulator, and to control, based on an output of the second multiplier, a bias voltage for the second optical modulator.

10. A bias controlling method for controlling a bias for an optical modulator that has a voltage-to-light-intensity characteristic in which intensity of output light changes with respect to an applied voltage, the method comprising:

multiplying a drive signal generated from input data and an electric signal that represents a light signal output from the optical modulator; and controlling a bias voltage for the optical modulator, based on a signal obtained by the multiplying, so that an output of an averaging device approaches zero.

* * * * *